US005790545A

United States Patent [19]
Holt et al.

[11] Patent Number: 5,790,545
[45] Date of Patent: Aug. 4, 1998

[54] EFFICIENT OUTPUT-REQUEST PACKET SWITCH AND METHOD

[75] Inventors: Craig Sheppard Holt, Cohasset; Richard Kline, E. Walpole; Krishnan Ramakrishnan, Plainville, all of Mass.

[73] Assignee: Motorola Inc., Schaumburg, Ill.

[21] Appl. No.: 616,024

[22] Filed: Mar. 14, 1996

[51] Int. Cl.$^6$ .................................................. H04L 12/56
[52] U.S. Cl. ................................................ 370/398; 370/413
[58] Field of Search .......................... 370/398, 399, 370/412, 413, 414, 415, 416, 417, 418, 422, 426, 362, 364; 340/825.79

[56] References Cited

U.S. PATENT DOCUMENTS

| | | | |
|---|---|---|---|
| 4,623,996 | 11/1986 | McMillen | 370/418 |
| 4,814,762 | 3/1989 | Faranszek | 340/825.79 |
| 4,939,720 | 7/1990 | Bakka | 370/417 |
| 5,001,706 | 3/1991 | Dghe et al. | 370/422 |

OTHER PUBLICATIONS

ATM "User–Network Interface Specification", Version 3.0, Fred Sammartino.
The ATM Forum Newsletter, Oct. 1995 vol. 3, Issue 4 "53 Bytes".
The ATM Forum, Technical Committee, "Traffic Management Specifications", Version 4.0, Feb., 1996.

*Primary Examiner*—Hassan Kizou
*Attorney, Agent, or Firm*—Darleen J. Stockley; Jeffrey T. Klayman

[57] ABSTRACT

A method (1200, 1500, 1600, 1700, 1800) and packet switch (500, 600, 700, 1400, 1900, 2000) for efficient switching of a plurality of received packets from a plurality of ingress ports to a plurality of egress ports, using the steps of: A) storing the packets in memory; B) sending arrival information for each packet to a destination egress port for the packet; C) storing, in memory at each destination egress port, the arrival information; D) requesting, by each destination egress port, the packets from the packet memory in accordance with a predetermined scheme; and E) sending, by the packet memory, to the destination egress ports, the packets requested.

41 Claims, 19 Drawing Sheets

400     PRIOR ART

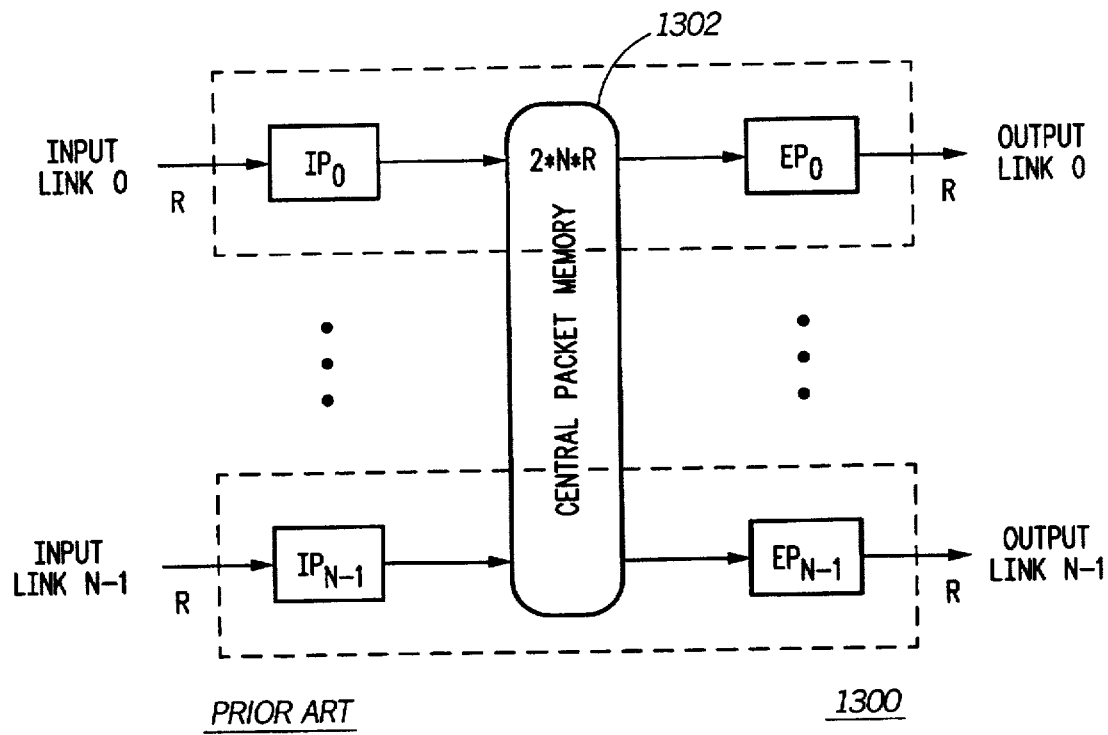
FIG. 13 *PRIOR ART*
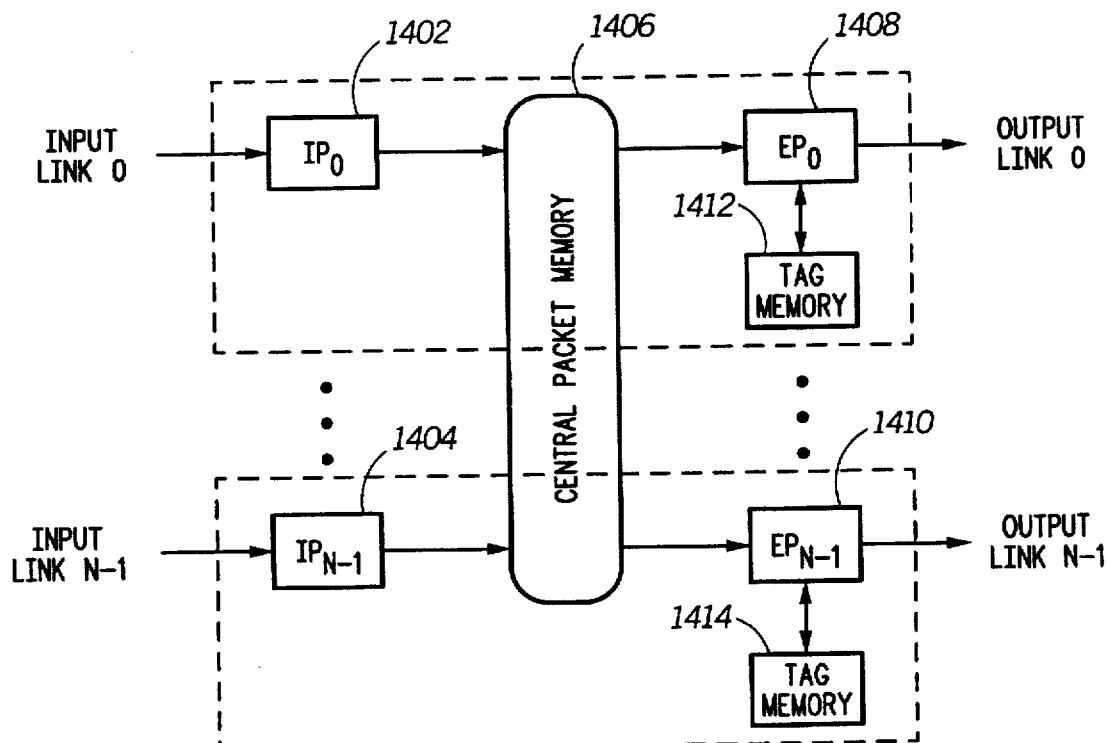
FIG. 14

EFFICIENT OUTPUT-REQUEST PACKET SWITCH AND METHOD

CO-PENDING APPLICATIONS

The present application may be related to co-pending applications that are being filed concurrently: U.S. application No. 08/616,029 filed Aug. 14, 1996 METHOD AND DEVICE FOR MULTIPOINT SWITCHING AND ARBITRATION IN OUTPUT-REQUEST PACKET SWITCH, by Craig Sheppard Holt, Richard Kline, and Krishnan Ramakrishnan; and U.S. application No. 08/616,147 filed Mar. 14, 1996, EVENT-DRIVEN PACKET SCHEDULER AND METHOD FOR SUPPORTING MULTIPLE SERVICE CATEGORIES IN AN ATM NETWORK, by Richard B. Kline.

FIELD OF THE INVENTION

The present invention relates generally to packet communication networks for transmitting a digitally coded packet, and more particularly, to efficient packet switching in a packet communication network.

BACKGROUND OF THE INVENTION

Packet switching is a technology for networking systems in which data from a plurality of users is divided into units called packets and transmitted over a common transmission line. Packet switching differs from circuit switching in that packet switching uses bandwidth allocated dynamically on demand across logical connections, as opposed to the long-term allocations of bandwidth provided in circuit switching. Packet switching can reduce costs to network users by providing better sharing of network resources than circuit switching. Packet switched service has the capability to handle any mixture of traffic types, such as voice, video, and data, simultaneously. It can also provide different classes of service, in terms of delay, jitter and probability of loss, to different connections.

Packet communication networks consists of "nodes" which are devices for creating, accepting, or transferring packets, and "links" that connect two nodes. In a packet communication network, packet messages are digitally encoded at a source node for transmission over some sequence of links and nodes to a destination node of the network. In a given transmission path, there generally are one or more intermediate nodes or "switches," where each switch connects multiple source and destination links.

FIG. 1, numeral 100, shows an abstract representation of a switch connecting N input links and N output links, each of rate R. The maximum throughput of the entire switch is less than or equal to N*R (102), (where "*" denotes multiplication). For each packet that arrives on an input link, the output link selected is dependent upon information contained in a preselected location within the packet. Three classes of packet switch designs known in the art are output-queued switches, input-queued switches, and shared-memory switches.

FIG. 2, numeral 200, is a block diagram showing packet flows in a typical output-queued switch architecture as is known in the art. The processing performed on each packet by the switch has two parts: ingress processing in an ingress port (IP) (202, 204, 206, ... 208), and egress processing in an egress port (EP) (226, 228, 230, ..., 232). Packets arrive at IPs and are directed to a selected EP through a switch fabric (234) capable, for example, of delivering all arriving packets (rate N*R). FIG. 2 shows, for example, a shared-media switch fabric, though other types are possible (e.g., crosspoint, banyan). Address filters (210, 212, 214, ..., 216) select the packets that are addressed to a particular EP. The selected packets are stored in, for example, first-in-first-out (FIFO) buffers (218, 220, 222, ..., 224), and then sent to egress ports (226, 228, 230, ..., 232).

In the output-queued switch, all packets arriving at IPs are transferred in a fixed amount of time to the output FIFOs. Note, however, that multiple packets may be directed to the same egress port at the same time, as shown in FIG. 3. It is this bursty nature of packet deliveries that creates the need for the FIFOs. If there are N switch inputs at rate R to IPs (302, 304, 306, ..., 308) across a switch fabric (334), then the FIFOs (318, 320, 322, ... 324) receiving an output from one of a plurality of address filters (310, 312, 314, ... 316) must be designed to accept packets at rate N*R, while packets are read out of FIFOs (326, 328, 330, ... 332) at rate R. For large switches, these FIFOs require the use of large, very high speed memories.

A variation on this design known in the art is the "Knockout" switch, described in U.S. Pat. No. 4,760,570, by Anthony Acampora et al., which allows a limited number (k) of packets to be accepted at an EP, where k<N. If more than k packets arrive at the EP, the Knockout switch drops the excess packets. Thus the Knockout switch reduces cost of the FIFO by reducing the writing rate from N*R to k*R, but, as a trade-off, may cause some packets to be lost.

FIG. 4, numeral 400, is a block diagram of a device having packet flows in a typical input-queued architecture as is known in the art. As in the output-queued case, there are IPs (402, 404, 406, ..., 408), EPs (426, 428, 430, ... 432), FIFOs (410, 412, 414, ..., 416) and a switch fabric (e.g., shared-media fabric 434 with rate N*R). However, in an input-queued switch, each EP can accept only one packet at a time. When multiple IPs have a packet to deliver to the same EP, the arbitration blocks (418, 420, 422, ..., 424) allow only one packet to be delivered; the rest are delayed or "blocked." The FIFOs are used to store the delayed packets. This "head-of-line blocking" behavior causes significantly lower performance than the performance of output-queued switches. The FIFOs, however, are only required to read and write data at rate R.

Thus, there is a need for a packet switch for efficient switching of a plurality of packets from a plurality of ingress ports to a plurality of egress ports.

BRIEF DESCRIPTION OF THE DRAWINGS

FIG. 13 is a block diagram of a device having packet flows in a typical shared-memory switch architecture as is known in the art.

FIG. 14 shows one embodiment of a device in accordance with the present invention, wherein packets are stored in a central shared memory.

DETAILED DESCRIPTION OF A PREFERRED EMBODIMENT

The present invention performs packet switching through a novel output-request mechanism. The invention results in packet switching performance comparable to output-queued switches, but with lower memory throughput requirements, and hence lower cost.

Figure 1:
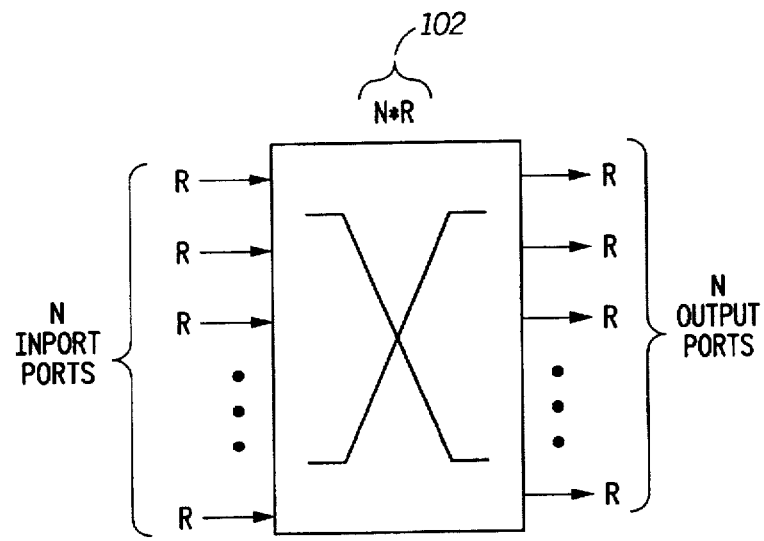
FIG. 1 shows an abstract representation of a switch connecting N input links and N output links, each of rate R.
Figure 2:
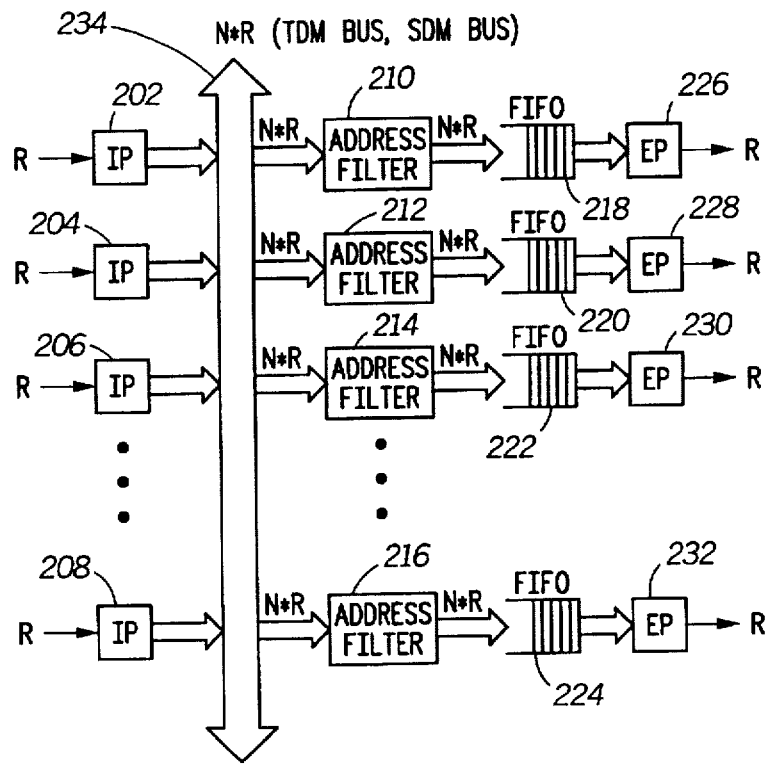
FIG. 2 is a block diagram of a device having packet flows in a typical output-queued switch architecture as is known in the art.
Figure 3:
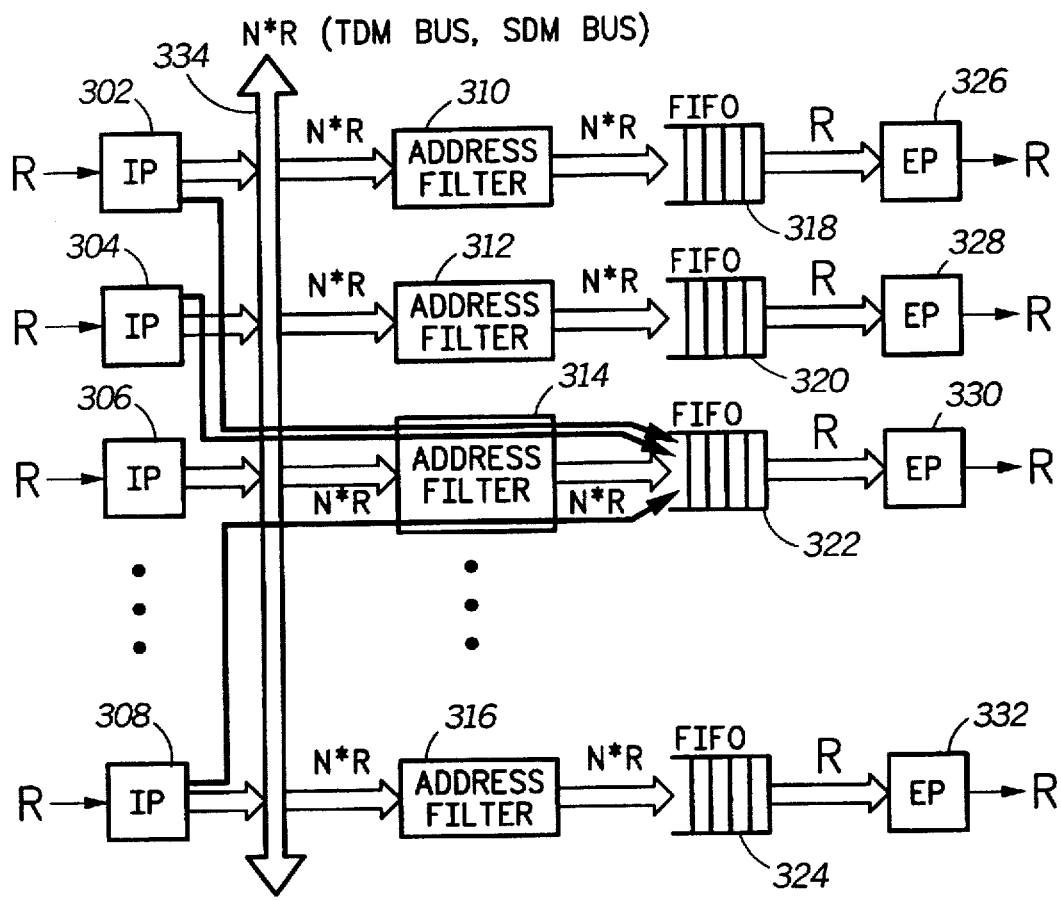
FIG. 3 shows a block diagram of a device wherein multiple packets directed to the same EP in the switch architecture of FIG. 2.
Figure 4:
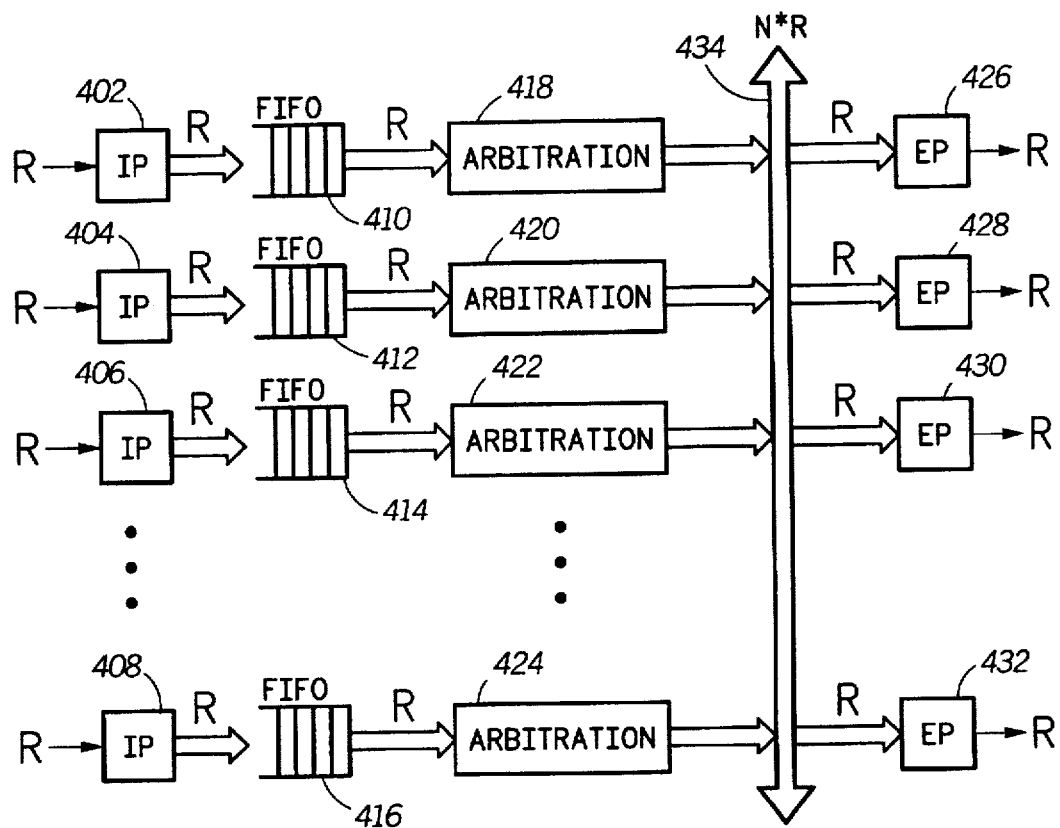
FIG. 4 is a block diagram representation of an input-queued switch architecture as is known in the art.
Figure 5:
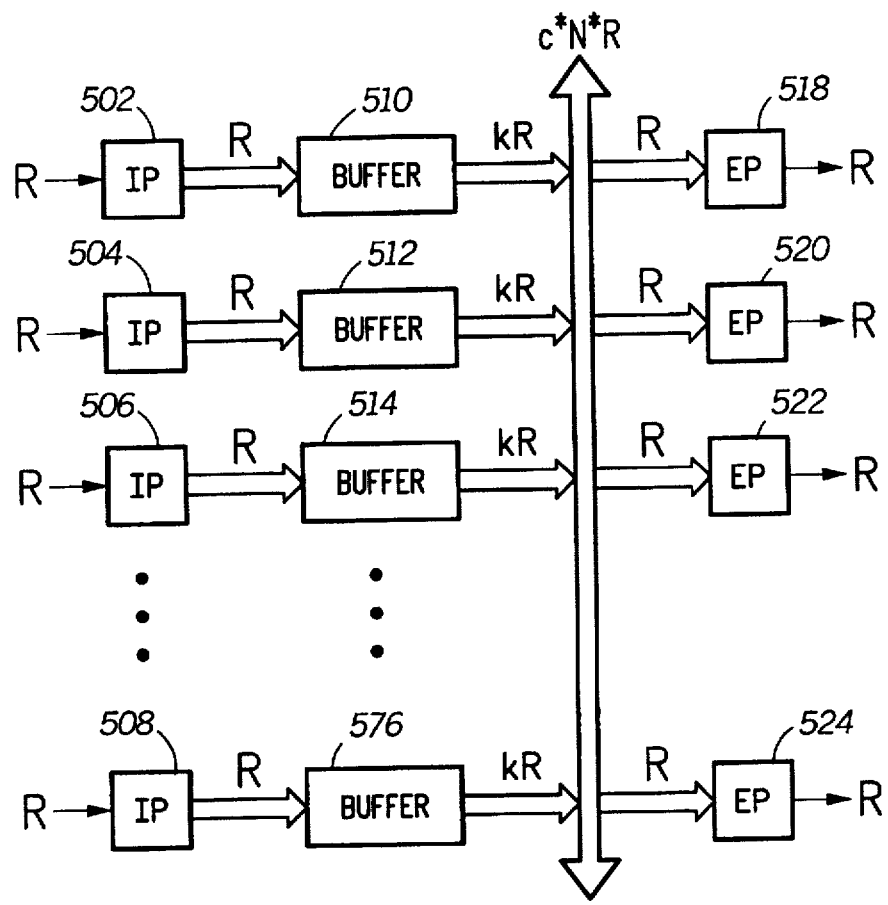
FIG. 5 is a block diagram of one embodiment of a device having a packet switch architecture with packet flows in accordance with the present invention wherein packets are stored in packet memories at the ingress ports.

FIG. 5, numeral 500, is a block diagram of one embodiment of a device having a packet switch architecture with packet flows in accordance with the present invention. Packets arrive at N ingress ports (IP)(502, 504, 506, ..., 508), are placed in buffers (510, 512, 514, ..., 516), are forwarded from the buffers to a switch fabric (e.g., shared bus 526), and are delivered to N egress ports (EP) (518, 520, 522, ..., 524). Each ingress/egress port includes an ingress processor/egress processor with an associated memory wherein three pathways are utilized for packet switching. Clearly numerous implementations of the pathways may be used, for example, time-shared buses and/or dedicated connections.

In the architecture of FIG. 5, EPs request packets from IPs, using control pathways to be described. IPs respond to requests by causing the requested packets to be read out of the associated buffer. If the rate of packet arrivals on each input link is R, then the rate that packets may be read out of each buffer is limited to $k*R$, (where k is a preselected integer less than or equal to N). If packets are requested from a given buffer at a rate greater than $k*R$, excess requests are refused. A refused request is repeated until the request is accepted.

For $k>1$, this output request architecture provides better throughput than input-queued switches. For relatively small values of k in respect to N (e.g. $k=4$, $N=16$), the switch throughput approaches that of output-queued architectures, and average queue lengths are smaller. Hence, like the Knockout switch, this architecture provides high performance and reduces the cost of the buffer by reducing its transfer rate to $k*R$ instead of $N*R$. Unlike the Knockout switch, however, no packets are lost.

Another feature distinguishing the present invention from output-queued architectures is that the total packet rate of the fabric need not be $N*R$. As shown in FIG. 5, the total packet rate of the switch fabric is $c*N*R$, where c is a preselected value in the range from 0 to 1. The value c is chosen so that $c*N*R$ is sufficient to support the average throughput requirements of the entire switch.

Figure 6:
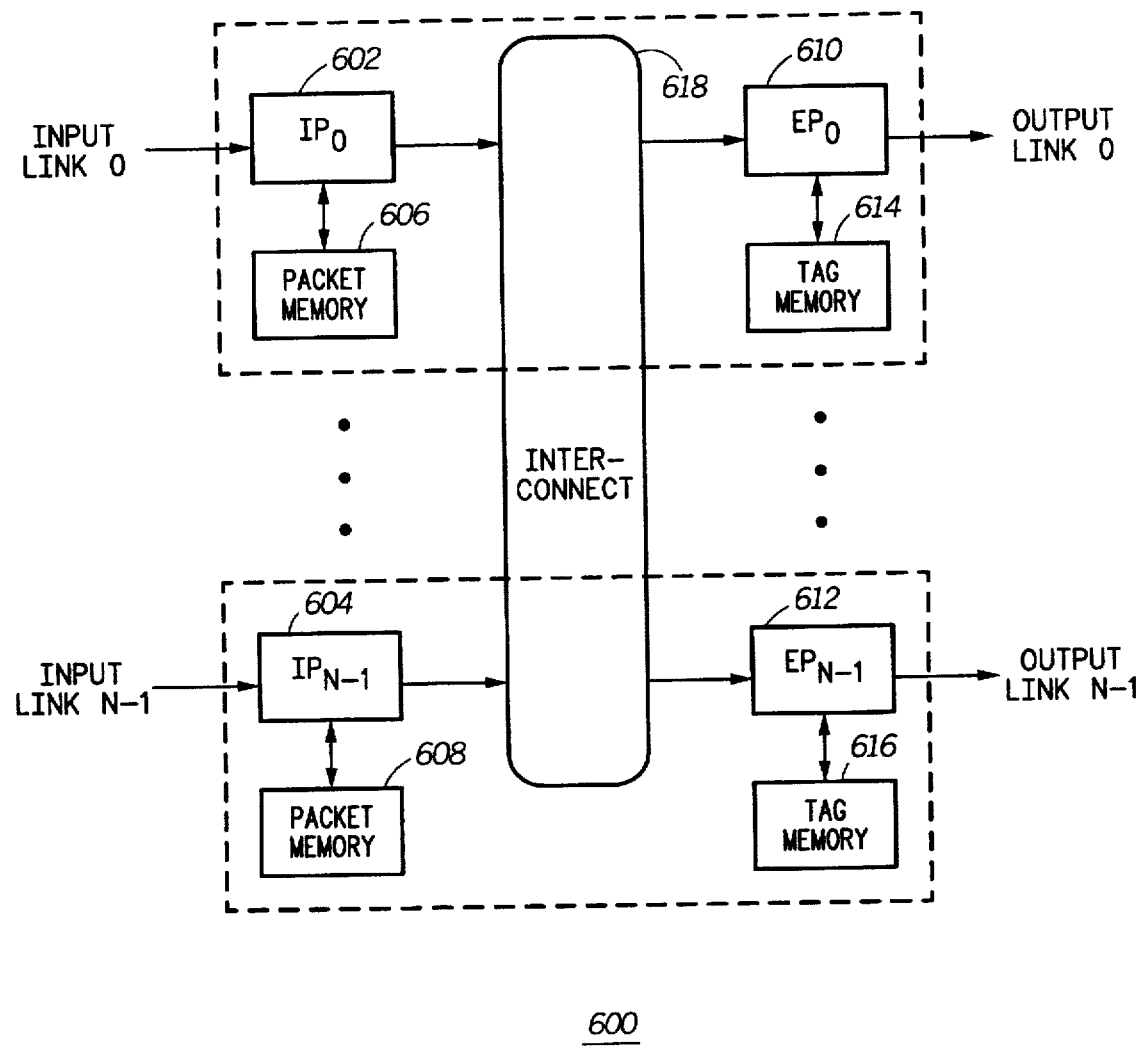
FIG. 6 is a block diagram of a device having an efficient packet switch structure in accordance with the present invention.

FIG. 6, numeral 600, is a block diagram of a device having an efficient packet switch structure in accordance with the present invention. Each port has ingress ports ($IP_0, ..., IP_{N-1}$) (602, ..., 604) and egress ports ($EP_0, ..., EP_{N-1}$) (610, ..., 612); each IP of a plurality of IPs (602, ..., 604) is connected to an associated packet memory (606, ..., 608) that is used to store received packets, and each EP of a plurality of EPs (610, ..., 612) is connected to a corresponding tag memory (614, ..., 616) used to store information about the packets waiting in IPs to be delivered to the attached EP. N is a preselected integer indicating the number of ports in the switch. The ingress ports and egress ports are interconnected (618). Incoming packets arrive via IPs and outgoing packets leave via EPs.

Figure 7:
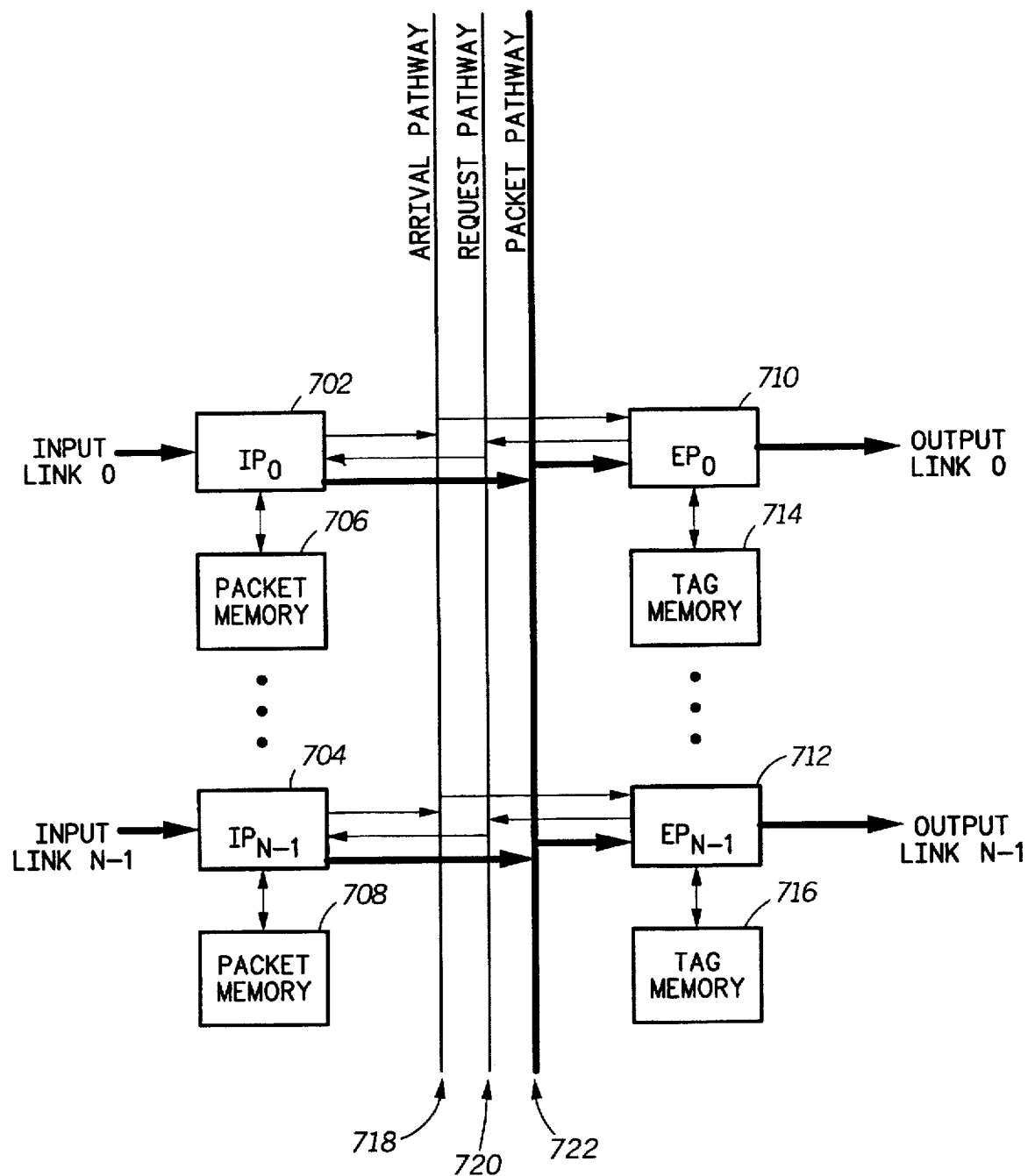
FIG. 7 shows a block diagram of one embodiment of a device in accordance with the present invention wherein the structure for the operation of transferring a packet from ingress to egress is shown in more detail.

FIG. 7, numeral 700, shows one embodiment of a device in accordance with the present invention wherein the structure for the operation of transferring a packet from ingress to egress is shown in more detail. The steps shown include:
A) determining, by a receiving IP (702, ..., 704), a destination EP for a received packet in accordance with a first predetermined scheme and storing the received packet in a packet memory (706, ..., 708) connected to the receiving IP; B) sending, by the receiving IP, to the destination EP, an arrival tag having at least a memory location and IP number indicating where the packet is stored; C) receiving, by a destination EP, the arrival tag/tags and storing the arrival tag/tags in a tag memory (714, ..., 716) connected to the destination EP (710, ..., 712); D) selecting, by the destination EP, a stored arrival tag in accordance with a second predetermined scheme, and sending the selected stored arrival tag back to the IP that sent the arrival tag to request transmission of the received packet associated with the arrival tag; E) receiving, by the IP, the selected stored arrival tag, retrieving the received packet associated with the arrival tag, and sending the received packet associated with the arrival tag to the destination EP; and F) receiving, by the destination EP, the received packet associated with the arrival tag and dispatching the received packet from the destination EP.

Figure 8:
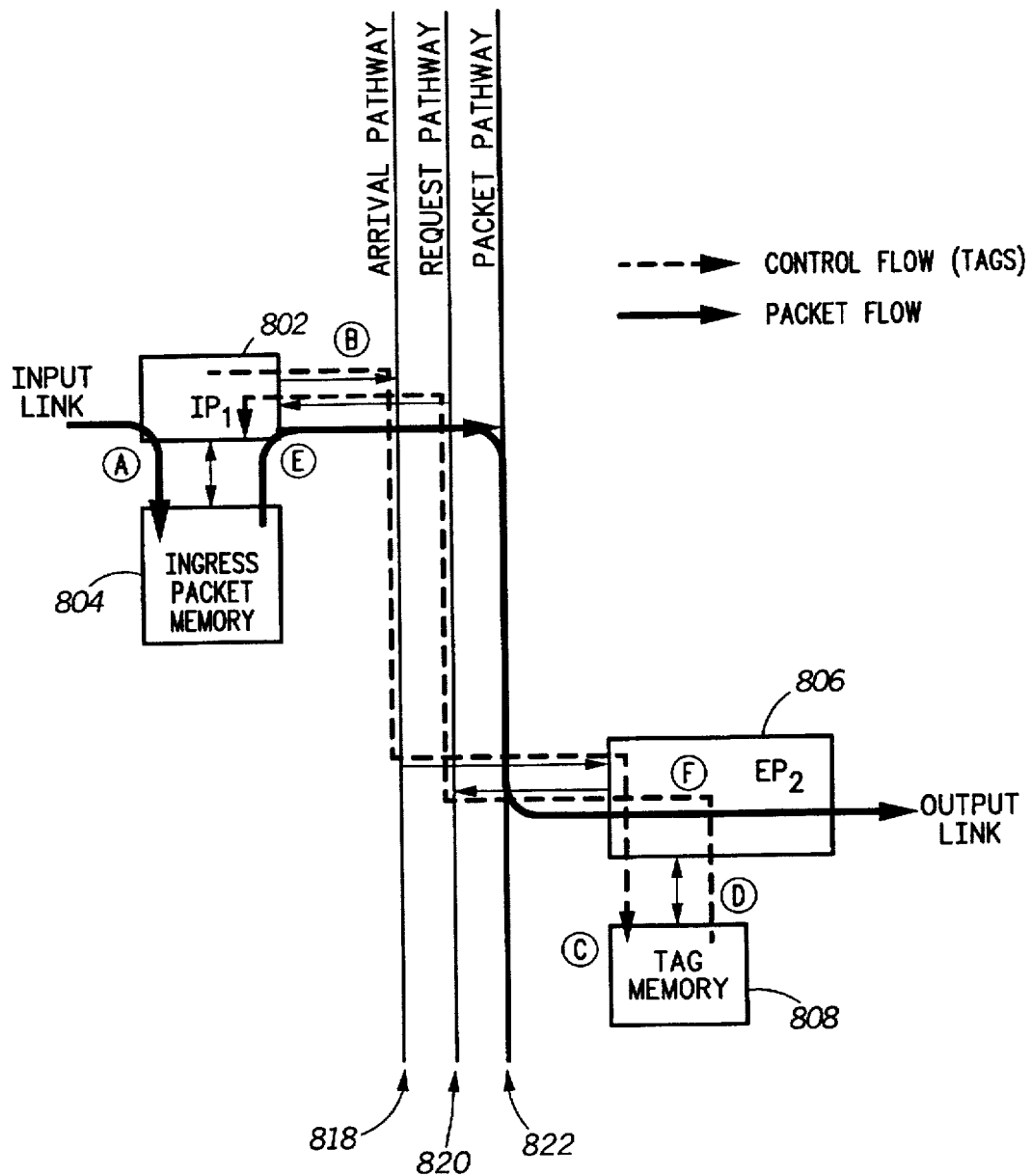
FIG. 8 is a block diagram showing the control flow and packet flow along an arrival pathway, a request pathway and a packet pathway in accordance with one embodiment of the present invention.

In a typical implementation, shown in FIGS. 7 and 8, numerals 700 and 800, the IPs and EPs are interconnected via an arrival pathway (718, 818), a request pathway (720, 820) and a packet pathway (722, 822). In the example shown, a packet arrives at $IP_1$ and is stored (a) in an ingress packet memory (804). An arrival tag is sent (b) on the arrival pathway (818) and stored (c) in a tag memory (808) of $EP_2$ (806). The arrival tag is retrieved (d) from the tag memory (808) and, using the request pathway (820) is sent back (e) to $IP_1$ (802). Then $IP_1$ (802) sends (f) the requested packet on a packet pathway (822) to the destination EP. Clearly numerous implementations of the pathways may be used, for example, time-shared buses and/or dedicated connections.

Where selected, the arrival tag may also include information for scheduling the packet in the destination EP. In selected implementations, for example, the EPs may organize tags, wherein the tags represent waiting packets, into multiple queues representing different connections, priorities, or qualities of service.

In step (e) of the operation of transferring a packet from ingress to egress, described above, where an IP may receive a plurality of arrival tags representing requests for packets from a plurality of EPs, in one implementation the IP may satisfy requests in accordance with a predetermined request rate and refuse requests exceeding the predetermined request rate. Where an EP's request is refused, the EP typically repeats the request after a predetermined time.

In one implementation, where the packet pathway has an information rate that is less than the sum of the maximum rates of all of the egress ports, but which is greater than the sum of the average rates of all of the egress ports, a rate of packet requests allowed on the request pathway by the EPs may be restricted to a predetermined level that does not exceed the information rate of the packet pathway. For example, FIG. 5 shows a switch in which the sum of the maximum rates of all the egress ports is $N*R$, but the packet pathway has a rate of only $c*N*R$. In an application for a switch wherein average link traffic rates are substantially less than the maximum rates, designing the packet pathway to handle such a reduced rate may lead to savings. One implementation of a mechanism for restricting the rate of requests from EPs to avoid requesting packets at a higher rate than the packet pathway can accommodate is given below.

Figure 9:
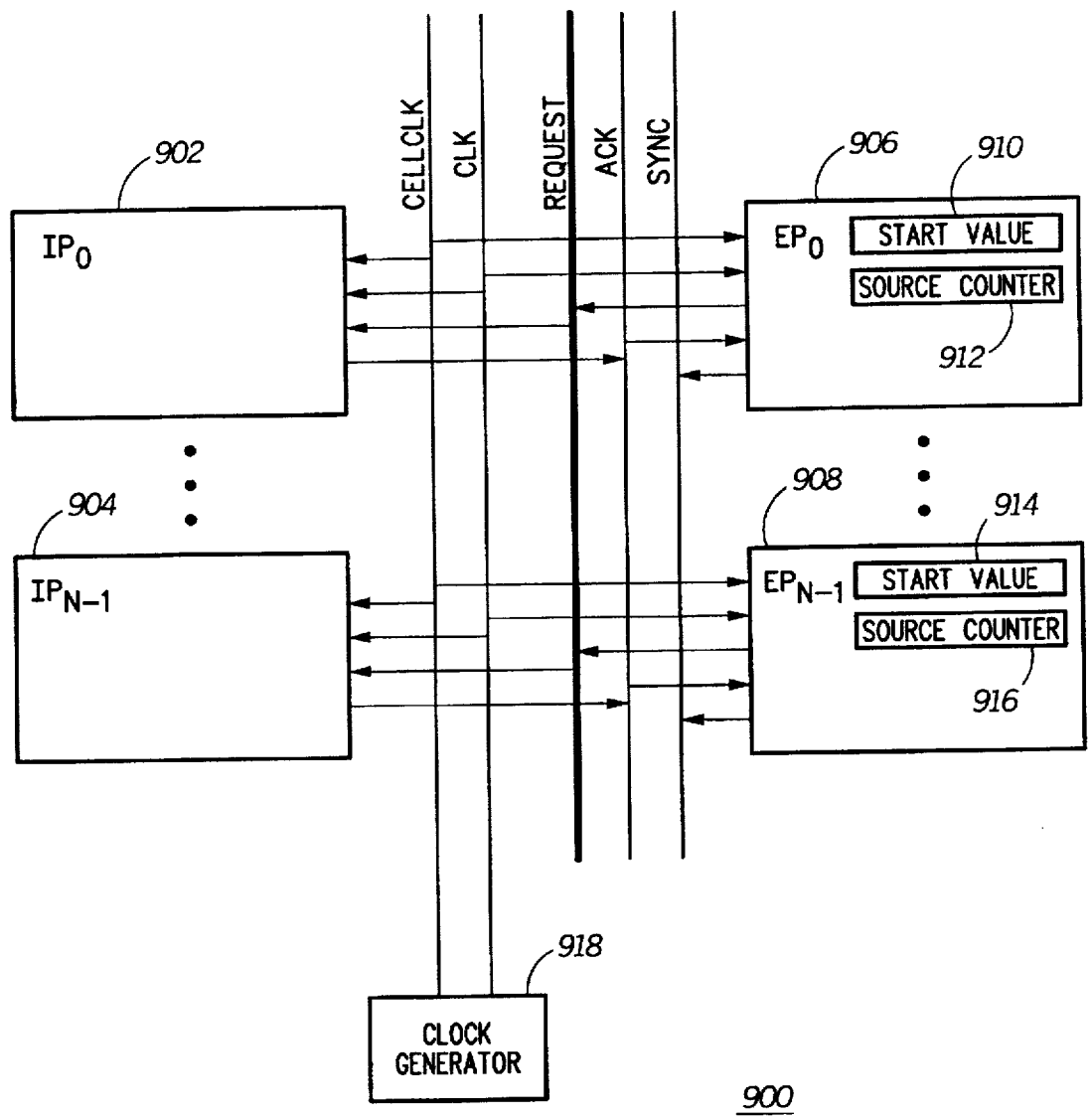
FIG. 9 shows one implementation of a device utilizing a predetermined synchronous arbitration scheme for a switch with N IPs and N EPs numbered from 0 to N-1 in accordance with the present invention.

The efficient packet switch of the present invention may be synchronized into cell cycles by means of a centrally generated clock (CELLCLK) signal by a clock generator (918), where a cell cycle is a period of time during which no more than one packet arrives at each IP of a plurality of IPs (902, . . . , 904), each IP generates only one arrival tag per cell cycle, and each EP of a plurality of EPs (906, . . . , 908) generates only one request per cell cycle. Further, each EP transmits on the output link a maximum of one packet per cell cycle. Each EP is has a START value register (910, . . . , 914) and a SOURCE counter (912, . . . , 916). Thus, FIG. 9, numeral 900, one implementation of a device utilizing a predetermined synchronous arbitration scheme for a switch with N IPs and N EPs numbered from 0 to N-1 in accordance with the present invention. Where the efficient packet switch is synchronized into cell cycles, the switch may utilize a predetermined arbitration scheme that, for each cell cycle, limits the number of requests accepted per IP to a preselected integer k associated with the IP, and limits the total number of requests accepted by all IPs to a predetermined integer M, where $M \leq c*N$. The predetermined limit k may be different for different IPs. In the following implementation the scheme is "distributed", meaning that it is performed by all IPs and EPs in parallel rather than by a central arbitration control unit.

The predetermined synchronous arbitration scheme utilizes two timing signals:

A) a cell cycle timing signal CELLCLK, and

B) an arbitration cycle timing signal CLK, where there are at least N+1 cycles of CLK for each cycle of CELLCLK, where N is the number of egress ports in the switch, and utilizes three control signals:

A) a REQUEST signal from EPs to IPs, wherein the REQUEST signal includes a VALID bit which is True where the EP is requesting a packet and an ingress port identification number, which specifies the IP from which a packet is being requested.

B) an ACKNOWLEDGE bit from IPs to EPs, and

C) a wired-OR synchronization (SYNC) bit for synchronizing EPs. The wired-OR SYNC bit is True if any EP asserts it, and False otherwise.

In a typical implementation the REQUEST signal is sent on a request bus, the ACKNOWLEDGE bit is sent on an acknowledge line connecting all IPs and EPs, and the SYNC bit is sent on a wired-OR SYNC line connecting all EPs.

Figure 10:
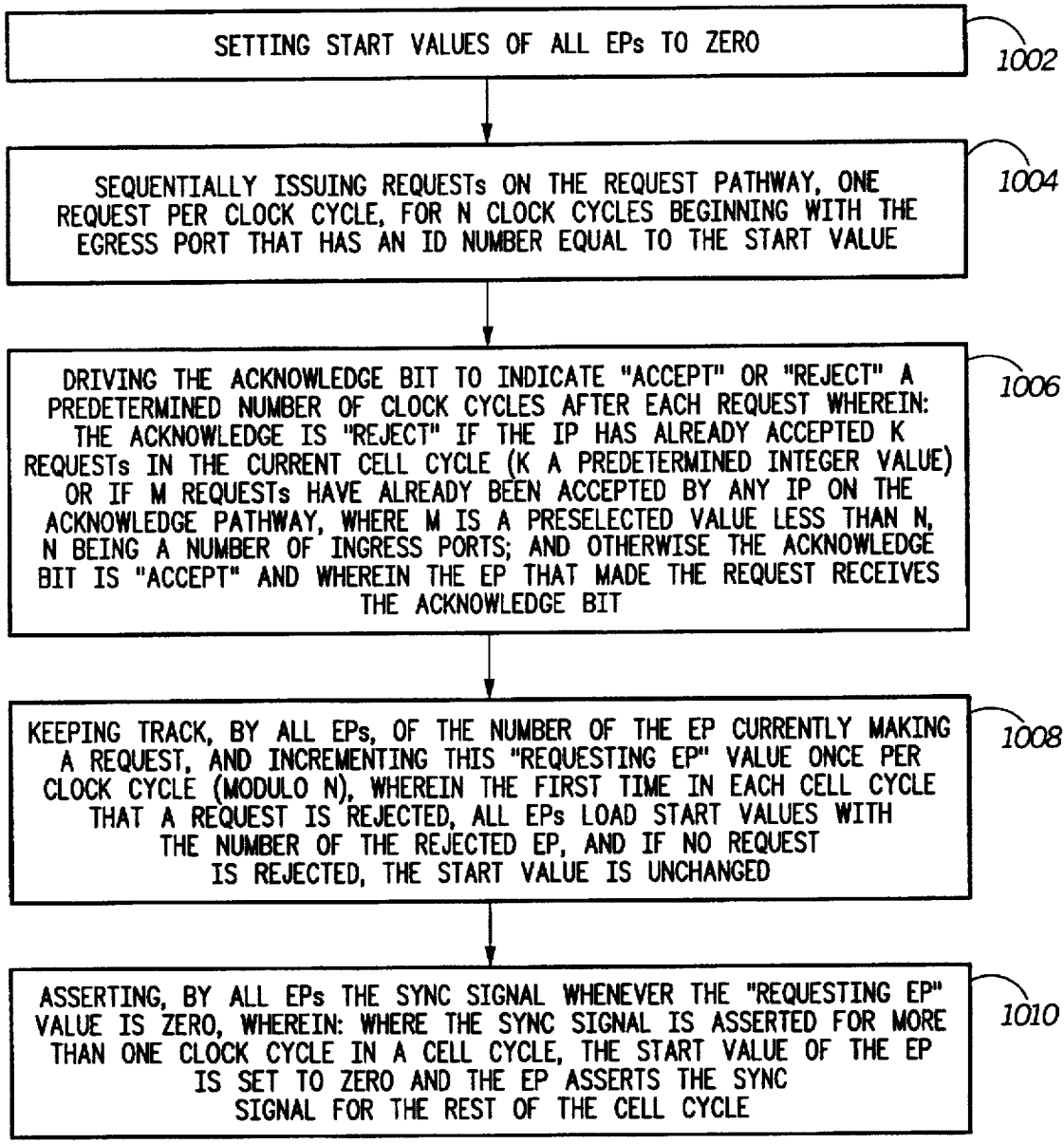
FIG. 10 is a flow chart showing one embodiment of steps for a predetermined arbitration scheme that may be utilized by ingress/egress ports in accordance with the present invention.

The steps of the arbitration method, shown in the flow chart of FIG. 10, numeral 1000, typically include:

1. At the beginning of each cell cycle, all EPs contain a same "START" value. Initially all EPs set their START values to zero (1002). Subsequent START values are obtained as described below. The START value designates the EP that begins the arbitration. Beginning with the egress port that has an ID number equal to the START value, EPs sequentially issue REQUESTs on the REQUEST Pathway, one REQUEST per clock cycle, for N clock cycles (1004). The REQUEST includes: a) a VALID bit=True where the EP has a REQUEST to make on the current cell cycle and a VALID bit=False otherwise; and b) where the VALID bit is True, a number of the IP that contains the requested cell.

2. A predetermined number of clock cycles after each REQUEST (typically 1-2 clock cycles), the addressed IP drives the ACKNOWLEDGE bit to indicate "Accept" or "Reject" (1006). The ACKNOWLEDGE is "Reject" if the IP has already accepted k REQUESTs in the current cell cycle (k a predetermined integer value) or if M REQUESTs have already been accepted by any IP on the acknowledge pathway, where M is a preselected value less than N, N being a number of ingress ports. Otherwise the ACKNOWLEDGE bit is "Accept". The EP that made the REQUEST receives the ACKNOWLEDGE bit.

3. All EPs keep track of the number of the EP currently making a REQUEST, incrementing this "requesting EP" value once per clock cycle (modulo N). The first time in each cell cycle that a REQUEST is rejected, all EPs load START values with the number of the rejected EP. If no REQUEST is rejected, the START value is unchanged (1008).

4. (Optional) To allow for detecting errors and synchronizing new EPs, there is a wired-OR SYNC signal. The SYNC signal is asserted by all EPs whenever the SOURCE counter value is zero (1010). Hence, where all EPs are synchronized, the SYNC signal is asserted for only one clock cycle in each cell cycle. Where the SYNC signal is asserted for more than one cycle, then there is a synchronization error. Whenever an EP detects that the SYNC signal is asserted for more than one clock cycle in a cell cycle, the START value of the EP is set to zero and the EP asserts the SYNC signal for the rest of the cell cycle.

At the end of the arbitration process, each EP has determined whether the EP's REQUEST will be satisfied and which EP will start the arbitration process in a next cell cycle. The entire arbitration process requires at least N+1 cycles since the ACKNOWLEDGE bit lags by least one clock cycle behind the REQUEST signal.

The switch typically includes N ingress ports and N egress ports with unique identification numbers, IDs, and having a request pathway from egress ports to ingress ports, and having an acknowledge line from ingress ports to egress ports. The steps of the predetermined arbitration scheme include: A) issuing, by each of a plurality of egress ports that have a current REQUEST, a REQUEST on the request pathway, wherein the REQUEST includes a VALID bit having values True and False, and a QPORT number specifying an ingress port ID, and wherein the REQUESTs of the plurality of egress ports are issued one at a time in a predetermined sequence; and B) responding, subsequent to each REQUEST in which the VALID bit is True, by an ingress port with an ID matching the QPORT in the REQUEST, with an ACKNOWLEDGE bit of Accept or Reject based at least on whether the ingress port has already accepted k REQUESTs and on whether M REQUESTs have already been accepted in the current cell cycle, k and M being predetermined integers.

The N egress ports generally have unique arbitration sequence numbers from 0 to N−1, and in step A, REQUEST signals are issued in round-robin order of the arbitration sequence numbers, and upon a REQUEST from an egress port being rejected, the first egress port that issued a rejected REQUEST in the current cell cycle is used as a new starting point for the next cell cycle.

Generally, all egress ports contain a START register and a SOURCE counter and the steps of the predetermined arbitration scheme include: A) maintaining a SOURCE counter by each egress port indicating the arbitration sequence number of the egress port currently making a REQUEST, and asserting a SYNC signal every time the egress port's SOURCE counter equals a predetermined value, and B) monitoring the SYNC signal by each egress port, and where the SYNC signal is asserted for more than one clock cycle in a cell cycle, resetting, by the egress port a START value to a preselected value, where the preselected value is the same for all egress ports.

Figure 11:
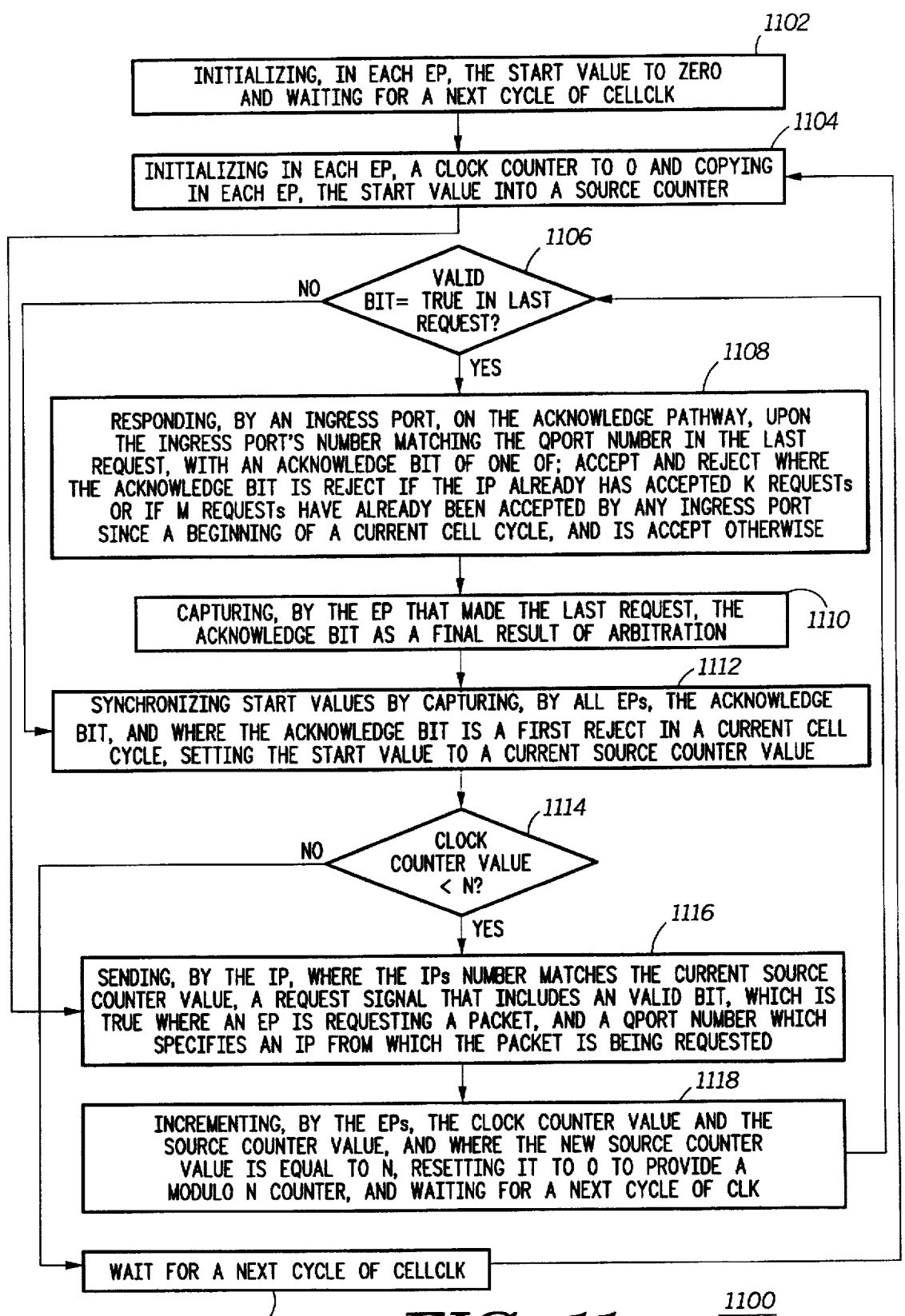
FIG. 11 is a flow chart showing one embodiment of steps for a predetermined arbitration scheme in accordance with the present invention.

In FIG. 11, numeral 1100, where the switch has N ingress ports, IPs, and N egress ports, EPs, numbered from 0 to N−1, and has a cell cycle timing signal CELLCLK and a timing signal CLK, there are typically at least N+1 cycles of CLK per cycle of CELLCLK, CELLCLK signals and CLK signals are provided to all ingress ports and all egress ports of said switch, and all egress ports contain a CLOCK counter. In this configuration, the predetermined arbitration scheme includes the steps of: A) initializing (1102) all egress port START values to zero and proceeding to step B at a beginning of a next CELLCLK cycle; B) initializing (1104), in each egress port, EP, a CLOCK counter to 0 and copying, in each EP, the START value into a SOURCE counter, and proceeding to step H (1116); C) proceeding (1106), upon the VALID bit in a last REQUEST being True, to step D (1108), and otherwise to step F (1112); D) responding (1108), by an ingress port, on the acknowledge pathway, upon the ingress port's number matching the QPORT number in the last REQUEST, with an ACKNOWLEDGE bit of one of: Accept and Reject where the ACKNOWLEDGE bit is Reject if the IP already has accepted k REQUESTs or if M REQUESTs have already been accepted by any ingress port since a beginning of a current cell cycle, where a number of REQUESTs accepted per IP is limited to a predetermined integer k associated with the IP, and a total number of REQUESTs accepted by the plurality of IPs is limited to a predetermined integer M, and is Accept otherwise; E) capturing (1110), by the EP that made the last REQUEST, the ACKNOWLEDGE bit as a final result of arbitration; F) synchronizing (1112) START values by capturing, by all EPs, the ACKNOWLEDGE bit, and where the ACKNOWLEDGE bit is a first Reject in a current cell cycle, setting the START value to a current SOURCE counter value; G) proceeding (1114), where the CLOCK counter value is less than N, to step H (1116), and otherwise to step J (1120); H) sending (1116), by the IP, where the IP's number matches the current SOURCE counter value, a REQUEST signal that includes a VALID bit, which is true where an EP is requesting a packet, and a QPORT number which specifies an IP from which the packet is being requested; I) incrementing (1118) the CLOCK counter value and the SOURCE counter value in all EPs and where the new SOURCE counter value is equal to N, resetting it to 0 to provide a modulo N counter, and returning to step C (1106) at the beginning of the next cycle of CLK; and J) returning (1120), by the EPs, at the beginning of the next CELLCLK cycle, to step B (1104).

Where selected, the arbitration scheme includes a recovery mechanism in case of error wherein the following step is added in step I prior to returning to step C at the beginning of the next cycle of CLK: asserting, by the EPs, a wired-OR SYNC signal when the EP's SOURCE counter value is equal to zero, and monitoring, by the EPs, the SYNC signal in each clock cycle, and where the SYNC signal is asserted for more than one clock cycle in a current cell cycle, setting the START value to zero and optionally asserting the SYNC signal for a remainder of the current cell cycle.

Figure 12:
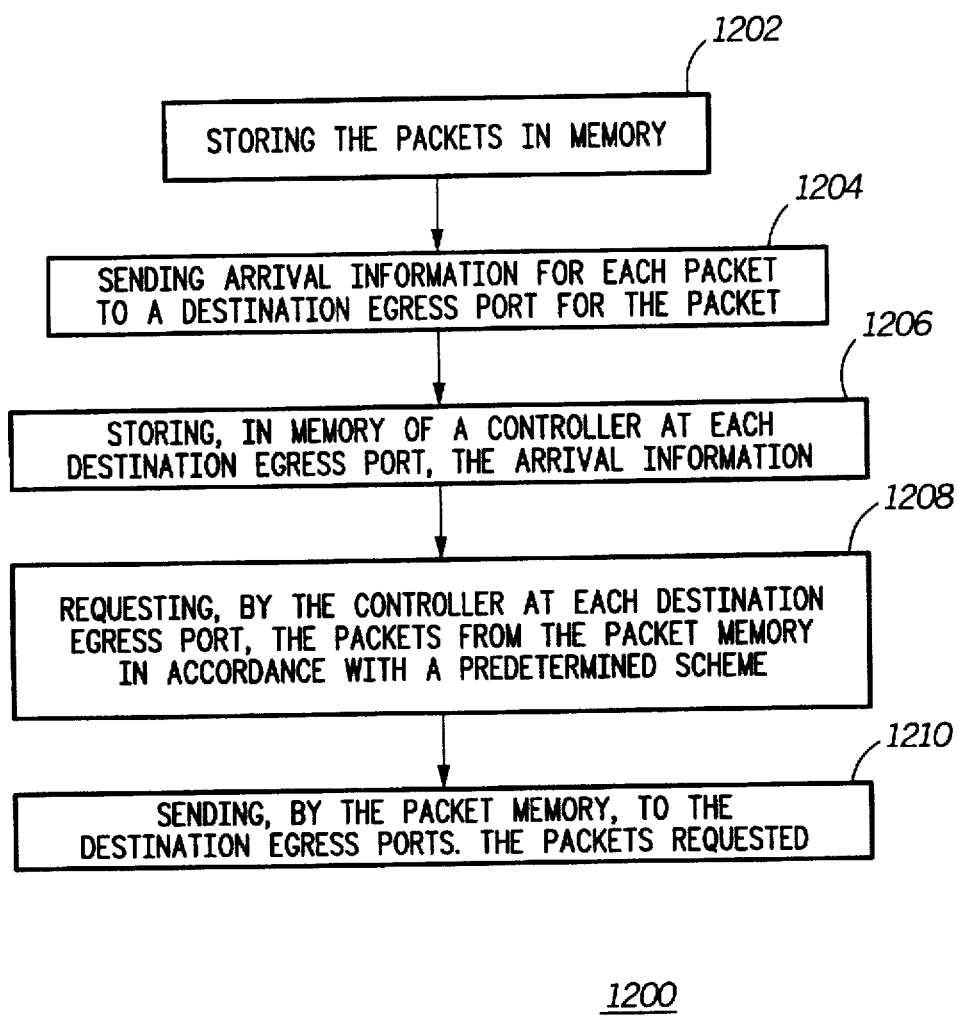
FIG. 12 is a flow chart showing one embodiment of steps of a method in accordance with the present invention.

Thus, as shown in FIG. 12, numeral 1200, the method for efficient switching of a plurality of packets from a plurality of ingress ports to a plurality of egress ports, includes the steps of: A) storing (1202) the packets in memory; B) sending arrival information (1204) for each packet to a destination egress port for the packet; C) storing (1206), in memory of a controller at each destination egress port, the arrival information; D) requesting (1208), by the controller at each destination egress port, the packets from the packet memory in accordance with a predetermined scheme; and E) sending (1210), by the packet memory, to the destination egress ports, the packets requested.

Typically, an ingress port sends packets requested at a rate up to a predetermined transmission rate and fails to send packets requested that require a transmission rate greater than the predetermined transmission rate, and where the packets fail to be sent, the destination egress ports re-request the packets that failed to be sent.

In a preferred embodiment of the method shown in FIG. 12, numeral 1200, the plurality of ingress ports are connected to the plurality of egress ports through a rate-limited switch fabric having a rate less than the sum of the maximum rates of all of the egress ports, but greater than the sum of the average rates of all of the egress ports.

FIG. 13, numeral 1300, is a block diagram of a device having packet flows in a typical shared-memory architecture as is known in the art. In a shared-memory switch, all packets arriving at IPs are transferred to a central packet memory (1302), and all packets delivered to EPs come from the central packet memory. The performance attained is similar to that of an output-queued switch, but to support N input links and N output links at rate R, the packet memory must be designed to access packets at a very high rate, specifically, 2*N*R.

FIG. 14, numeral 1400, shows one embodiment of a device in accordance with the present invention, wherein packets are stored in a central shared memory. In the shared-memory switch of the present invention, all packets arriving at IPs (1402, ..., 1404) are transferred to a central packet memory (1406), and all packets delivered to EPs (1408, ..., 1410) come from the central packet memory (1406). Each EP of a plurality of EPs (1408, ..., 1410) is connected to a corresponding tag memory (1412, ..., 1414) which is utilized as described above. Again, N is a preselected integer indicating the number of ports in the switch.

Figure 15:
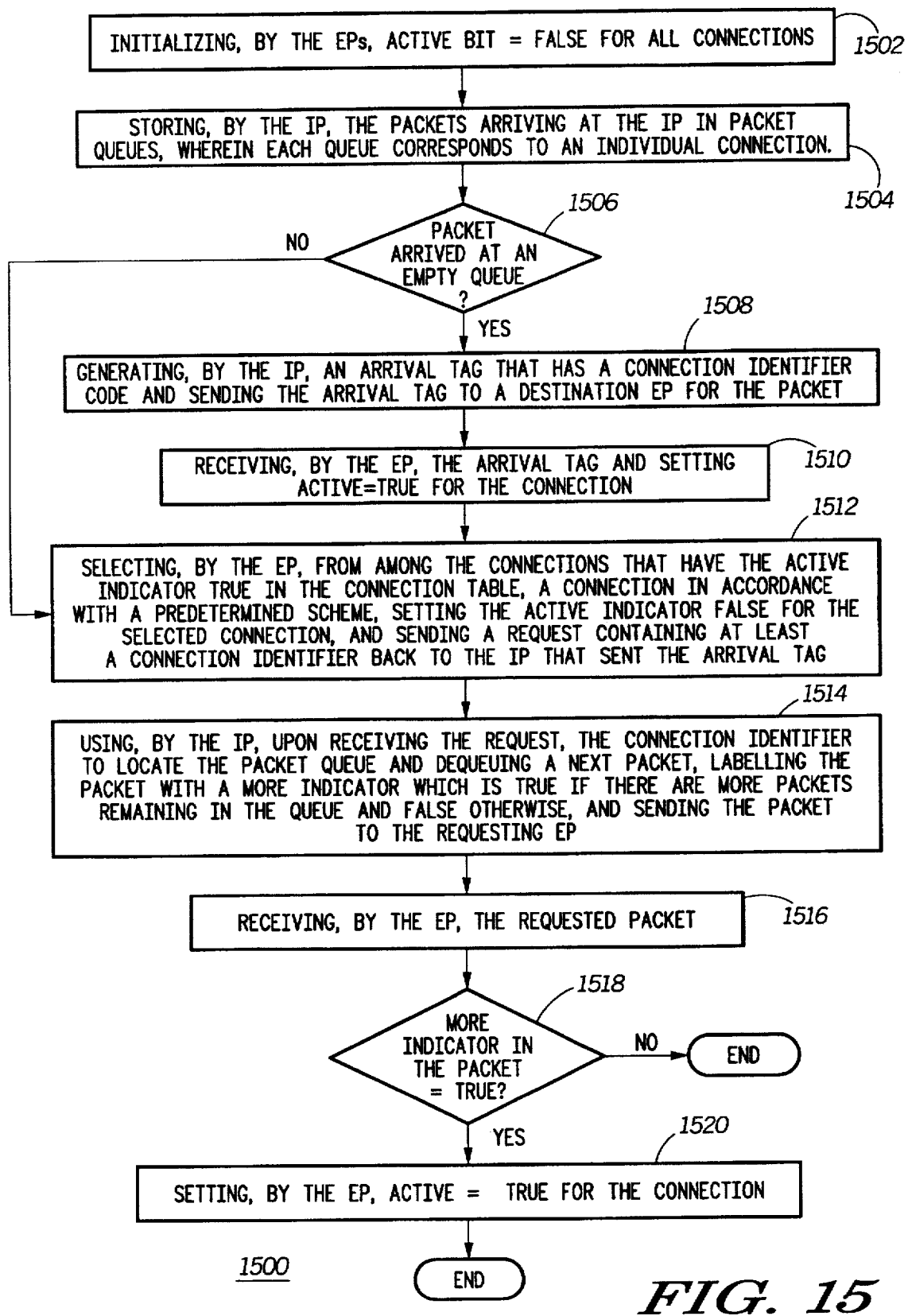
FIG. 15 is a flow chart showing one embodiment of steps of a method in accordance with the present invention wherein the tag memory is replaced by a small connection table.

In a connection-oriented network, that is, one in which packets flow along pre-arranged routes, output-request packet switching may be performed using a small connection table containing one entry per connection in place of the tag memory which may contain many tags per connection. FIG. 15, numeral 1500, shows one embodiment of a method for performing output-request packet switching in accordance with the present invention, in storing at most one tag per active connection. The method includes the following steps: First, where the EPs have initialized (1502) the ACTIVE bit to be equal to False for all connections, a received packet that arrives at an IP via an ingress port is stored (1504) in a queue in a memory, wherein each queue corresponds to an individual connection; Then, for each packet that arrives at the IP, the IP determines (1506) whether the packet has arrived at an empty queue, and where the packet has arrived at an empty queue, the IP generates (1508) an arrival tag that has a connection identifier code, and where selected, may also include scheduling information. Where the arrival tag is generated, the IP sends the arrival tag to a destination EP for the packet. The EP receives (1510) the arrival tag and records its arrival, typically by setting an ACTIVE bit in a connection table coupled to the EP, where the connection table has an ACTIVE bit for each connection that goes through the EP. The EP selects (1512), from among all the connections that have the ACTIVE bit set in the connection table, a connection in accordance with a predetermined scheme, clears the ACTIVE bit for the selected connection, and sends a request containing at least a connection identifier back to the IP that sent the arrival tag. Upon receiving the request, the IP uses (1514) the connection identifier to locate the packet queue and dequeues a next packet, labels the packet with a MORE bit which is True if there are more packets remaining in the queue and False otherwise, and sends the packet to the requesting EP. Then, the EP receives (1516) the requested packet and transmits the packet from the associated egress port. Where the MORE bit in the packet is True (1518), the EP also sets (1520) the ACTIVE bit for the connection.

As an example of the operation shown in FIG. 15, assume the ingress port queue for connection "C" is initially empty, and then two packets arrive in rapid succession and are placed in this queue. Since the first packet arrives at an empty queue, an arrival tag is sent to the EP for connection C, causing the EP to set the ACTIVE bit for connection C True. The EP periodically selects connections that have the ACTIVE bit True, using a predetermined scheme. When the EP selects connection C, a request is sent to the IP for connection C. The IP then dequeues the first of the two packets, and sends it back to the EP. The MORE bit sent with the packet is set True, since another packet remains in the queue.

The second packet is handled differently. Since the second packet did not arrive at an empty queue, no arrival tag was sent to the EP. However, the ACTIVE bit for connection C remains True, so the EP does eventually select connection C again. The EP then requests the next packet of connection C from the IP. The IP returns the second packet with MORE= False, since no more packets remain in the queue. The False MORE bit causes the EP to set the ACTIVE bit False, so that no more packets will be requested by the EP.

The procedures herein may be pipelined for higher throughput. Pipelining refers to a technique of partitioning a sequential process into subprocesses, with each subprocess being executed in a special dedicated module, and multiple modules operating concurrently on different data elements (in this case, operating on different packets).

With the operation shown in FIG. 15, where multiple packets of a certain connection are waiting to be requested by an EP, the EP must request a packet and then wait for that packet to arrive before requesting the next one. For a higher-rate operation in a pipelined system, the procedure may be modified to give the egress port information about the number of packets waiting that it can request. This can be done, for example, by keeping a sequence count of packets arrived at each connection at the ingress port, and whenever a packet is requested by the egress port, labeling the packet with the latest sequence count for the associated connection. The egress port also maintains a sequence count for each connection of packet requests it has issued. Hence the egress port can compare its sequence count to the count in arriving packets to determine whether there are more packets waiting in the ingress queue. With these modifications, in a pipelined system, an EP may request multiple packets from the same connection in rapid succession, rather than having to wait for each requested packet to arrive at the EP before requesting the next one.

As set forth in FIG. 16, numeral 1600, the method of the present invention may be implemented as follows. For each connection through an IP, there is an associated modulo sequence count value ARRIVSEQ, typically 1 to 4 bits long, where the modulo of ARRIVSEQ is S, and "#" denotes addition modulo S. Initially the ARRIVSEQ value for each connection is set to an arbitrary value. Also, coupled to the EP there is a connection table with an entry for each connection through the EP, containing at least an ACTIVE bit, a MANY bit, a REQSEQ value, and a LASTSEQ value, wherein REQSEQ and LASTSEQ values have the same number of bits as ARRIVSEQ. The ACTIVE bit and the MANY bit for each connection are initially set to False (1602). In the following, "||" denotes the Boolean OR operator. Packets are switched from ingress ports to egress ports by means of the following steps:

A) For each packet received by an IP, the IP stores (1604) the packet in a packet queue in a memory, wherein each queue corresponds to an individual connection. The IP also updates the ARRIVSEQ value for the connection to ARRIVSEQ#1, i.e. ARRIVSEQ is incremented modulo S;

B) For each packet that arrives at the IP, the IP determines (1606) whether the packet has arrived at an empty queue, and where the packet has arrived at an empty queue, proceeds to step C (1608), and otherwise, to step E (1612).

C) The IP generates (1608) an arrival tag that has a connection identifier code, and where selected, includes scheduling information, and sends the arrival tag to a destination EP for the packet. The IP sets the ARRIVSEQ value for the connection to a preselected value SEQSTART#1.

D) The EP receives (1610) the arrival tag and records an arrival of the arrival tag by setting the ACTIVE bit True, setting REQSEQ to SEQSTART, and setting LASTSEQ to SEQSTART#1 in the connection table entry for the connection.

E) The EP uses a predetermined scheme to select (1612) a connection from among the connections that have ACTIVE bit True in the connection table. For the selected connection, the EP sends a request containing at least a connection identifier back to the IP that sent the arrival tag. The EP also updates the REQSEQ value for the selected connection to REQSEQ#1, and compares the new value of REQSEQ to the value of LASTSEQ for the selected connection. Where they are equal and the MANY bit for the connection is False, the EP clears (1616) the ACTIVE bit for the connection.

F) Upon receiving the request, the IP uses the connection identifier to locate (1618) the packet queue and dequeues a next packet. The IP labels the packet with the ARRIVSEQ value for the connection, and where the number of packets in the packet queue is greater than or equal to S, sets a MANY bit in the packet True and otherwise False. The IP then sends the packet to the requesting EP.

G) The EP receives (1620) the requested packet, copies the ARRIVSEQ label in the packet to the LASTSEQ value for the connection in the connection table, and copies the MANY bit in the packet to the MANY bit for the connection in the connection table. Where LASTSEQ≠REQSEQ ‖ MANY=True for the connection, the EP sets (1624) the ACTIVE bit for the connection True.

In the procedure described above, ARRIVSEQ, REQSEQ, and LASTSEQ may be viewed as packet sequence numbers, modulo S. The ARRIVSEQ value at the IP is the sequence number of the last packet that arrived. Each packet sent to the EP is accompanied by the newest ARRIVSEQ value, which is stored in the EP as LASTSEQ. LASTSEQ tells the EP the sequence number of the last request the EP will have to make. The EP keeps track of the sequence number of its current request in REQSEQ. When REQSEQ catches up to LASTSEQ, the EP stops requesting packets. Since REQSEQ and LASTSEQ are modulo counts, they can be equal even though many packets may remain in the IP's queue, but in such cases the MANY bit keeps the EP from stopping.

Figure 16:
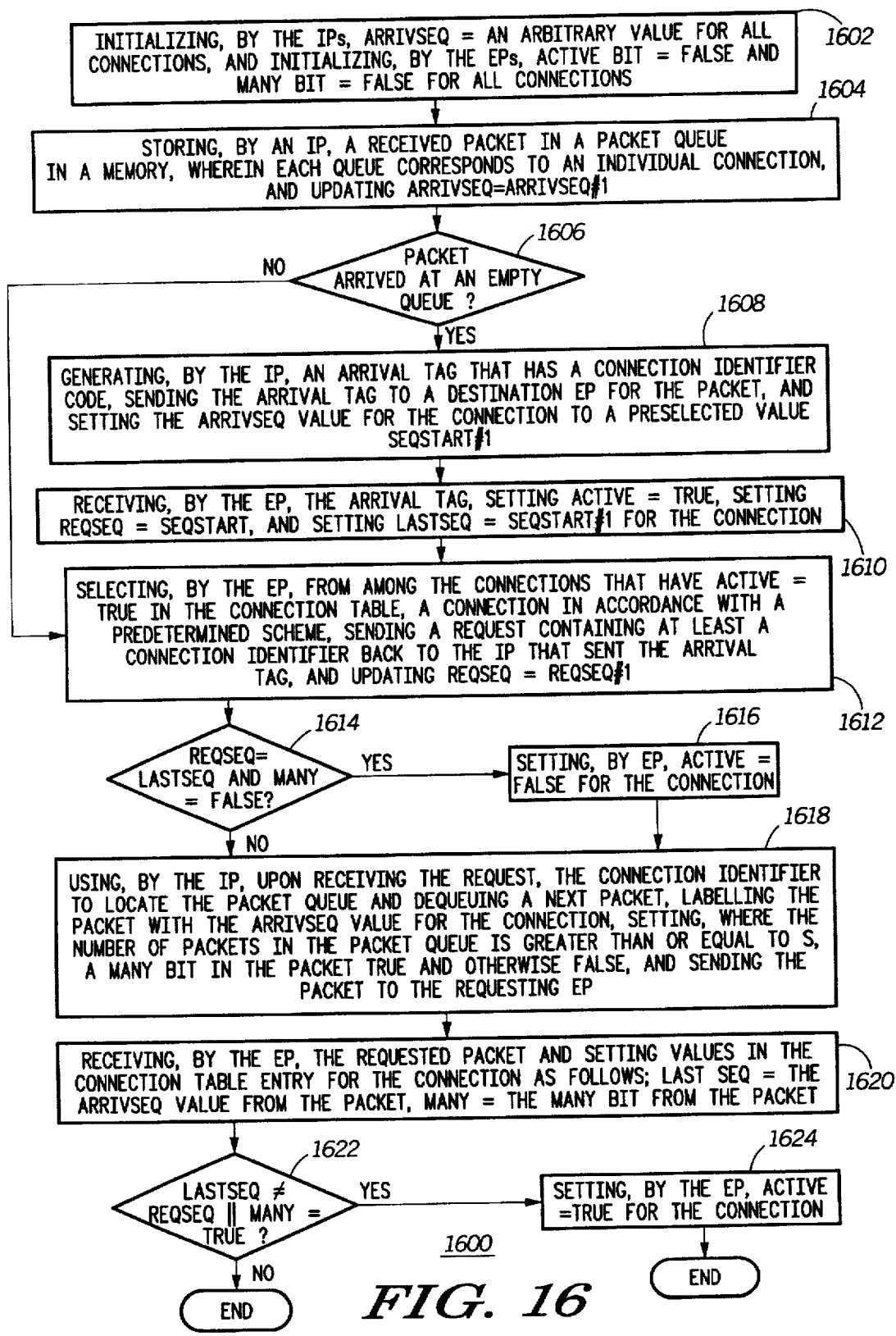
FIG. 16 is a flow chart of another embodiment of steps of a method in accordance with the present invention wherein a higher rate operation may be achieved.

As an example of the operation shown in FIG. 16, let the value of SEQSTART be 0, and let the modulo S be 4. Assume the ingress port queue for connection "C" is initially empty, and then six packets arrive in rapid succession and are placed in this queue. Since the first packet arrives at an empty queue, ARRIVSEQ is set to SEQSTART #1=0+1 mod 4=1. Also, an arrival tag is sent to the EP for connection C, causing the EP to set REQSEQ=0, LASTSEQ=1, and ACTIVE=True for the connection.

Subsequent packet arrivals cause the ARRIVSEQ value at the IP to be incremented repeatedly up to 6 mod 4=2. The EP periodically selects connections that have the ACTIVE bit True, using a predetermined scheme. The first time the EP selects connection C, REQSEQ is incremented to 1, and since REQSEQ now equals LASTSEQ, the ACTIVE bit for the connection is set False. A request is sent to the IP for connection C, and in response, the IP dequeues the first packet, and sends it back to the EP. The IP labels the packet with the current value of ARRIVSEQ which is 2, and with MANY=True since the number of packets remaining in the queue is 5 which is greater than S. Upon receiving this packet, the EP sets LASTSEQ=ARRIVSEQ=2 and MANY= True for the connection. Since the new value of LASTSEQ does not equal REQSEQ, the ACTIVE bit for the connection is also set True.

The last five packets do not arrive at an empty queue and therefore do not cause any arrival tags to be sent to the EP. However, the ACTIVE bit for connection C remains True, so the EP does eventually select connection C again. The EP then requests the next packet of connection C from the IP and updates REQSEQ to 2. Since MANY is True, ACTIVE remains True. The IP sends the second packet, again labelled ARRIVSEQ=2 and MANY=True.

The next time the EP selects connection C, REQSEQ is updated to 3, and since LASTSEQ=2 does not equal REQSEQ=3, the ACTIVE bit remains True. Upon receiving the EP's request, the IP sends the third packet, this time labelled ARRIVSEQ=2 and MANY=False, since fewer than S packets now remain in the queue.

Similarly, the next two times the EP selects connection C and requests a packet, REQSEQ is incremented to 4 mod 4=0, then to 1, and ACTIVE remains True. The packets sent by the IP, which are the fourth and fifth packets, are still labelled ARRIVSEQ=2 and MANY=False.

The next time the EP selects connection C, REQSEQ is incremented to 2. Since REQSEQ now equals LASTSEQ and MANY=False, the ACTIVE bit is set False. The sixth and last packet is requested and sent by the IP, still labelled ARRIVSEQ=2 and MANY=False. Since the ACTIVE bit for the connection is now False, the EP does not request any more packets from this connection.

For maximum speed operation, the modulo S is selected to be greater than the number of packets that may be requested by an EP during the delay between request of a packet in step D and the packet being received in step F.

The modulo sequence counters described above are just one method of giving the EP information about how many unrequested packets remain in the queue. More generally, the method of the present invention is as follows:

Initially, for each connection through an IP, the IP has queue status information which is set to a first predetermined starting value, and for each connection through an EP, there is an entry in a connection table coupled to the EP, containing at least an ACTIVE indicator initially set to False, request status information initially set to a second predetermined starting value, and queue status information initially set to a first predetermined starting value. Packets arriving at the ingress ports are stored in packet queues, wherein each queue corresponds to an individual connection. Cells are switched from the ingress ports to the egress ports by means of the following steps:

A) For each packet that arrives at the IP, the IP updates the queue status information for the associated connection, and determines whether the packet has arrived at an empty queue. Where the packet has arrived at an empty queue, the IP generates an arrival tag that has a connection identifier code, and where selected, may also include scheduling information. Where an arrival tag is generated, the IP sends the arrival tag to a destination egress port EP for the packet, and proceeds to step B, and otherwise to step C;

B) The EP receives the arrival tag and records an arrival of the arrival tag by setting the ACTIVE indicator for the connection to True;

C) The EP uses a predetermined scheme to select a connection from among the connections that have the ACTIVE indicator True in the connection table, and sends a request containing at least a connection identifier back to the IP that sent the arrival tag. The EP also updates the request status information for the connection. Using at least one of: queue status information and the request status information, the EP determines whether packets remain in the packet queue that are unrequested by the EP, and where packets remain in the packet queue that are unrequested by the EP, the EP sets the ACTIVE indicator False in the connection table;

D) Upon receiving the request, the IP uses the connection identifier to locate the packet queue, dequeues a next packet, updates the queue status information, labels the packet with queue status information that the EP will use for determining whether unrequested packets remain in the packet queue, and sends the packet to the requesting EP; and E) The EP receives the requested packet and stores the queue status information. Where the ACTIVE indicator for the selected connection is False, the EP determines, using at least one of: queue status information and the request status information, whether packets remain in the packet queue that are unrequested by the EP, and where packets remain in the packet queue that are unrequested by the EP, the EP sets the ACTIVE indicator True in the connection table.

Figure 17:
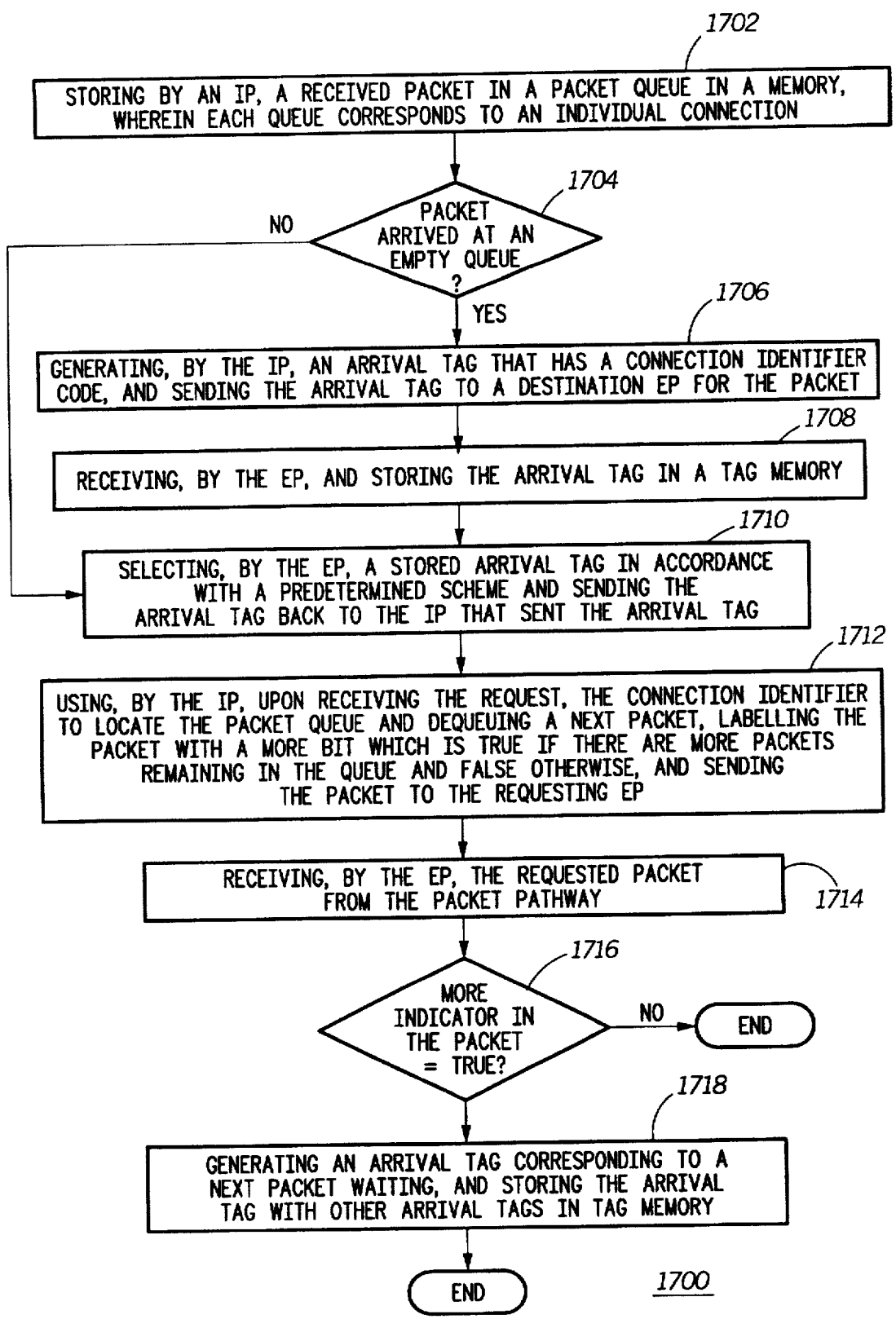
FIG. 17 is a flow chart of one embodiment of steps in accordance with the method of the present invention wherein arrival information is recorded at the EPs by storing at most, one tag per connection.

In another embodiment, arrival information is recorded at the EPs by storing arrival tags, typically in a queuing arrangement, in addition to or instead of setting ACTIVE indicators in a connection table. In this scheme, the EPs store, at most, one tag per connection. For example, as shown in FIG. 17, numeral 1700, one embodiment operates by the following steps. First, a received packet that arrives at an IP via an ingress port is stored (1702) in a queue in a memory, wherein each queue corresponds to an individual connection. For each packet that arrives at the IP, the IP determines (1704) whether the packet has arrived at an empty queue, and where the packet has arrived at an empty queue, the IP generates (1706) an arrival tag that has a connection identifier code, and where selected, may also include scheduling information and where the arrival tag is generated, the IP sends the arrival tag to a destination EP for the packet. Where the arrival tag is generated, the EP receives and stores (1708) the arrival tag. The EP selects (1710) a stored arrival tag in accordance with a predetermined scheme, e.g., removing the tag in a first-in-first-out order, and sends the arrival tag back to the IP that sent the arrival tag. Upon receiving the request, the IP uses (1712) the connection identifier to locate the packet queue and dequeues a next packet, labels the packet with a MORE bit which is True if there are more packets remaining in the queue, and False otherwise, and sends the packet to the requesting EP. The EP receives (1714) the requested packet and transmits (1716) the packet from the associated egress port. Where the MORE bit in the packet is True (1716), the EP generates (1718) an arrival tag corresponding to the next packet waiting and stores the arrival tag with other arrival tags.

Figure 18:
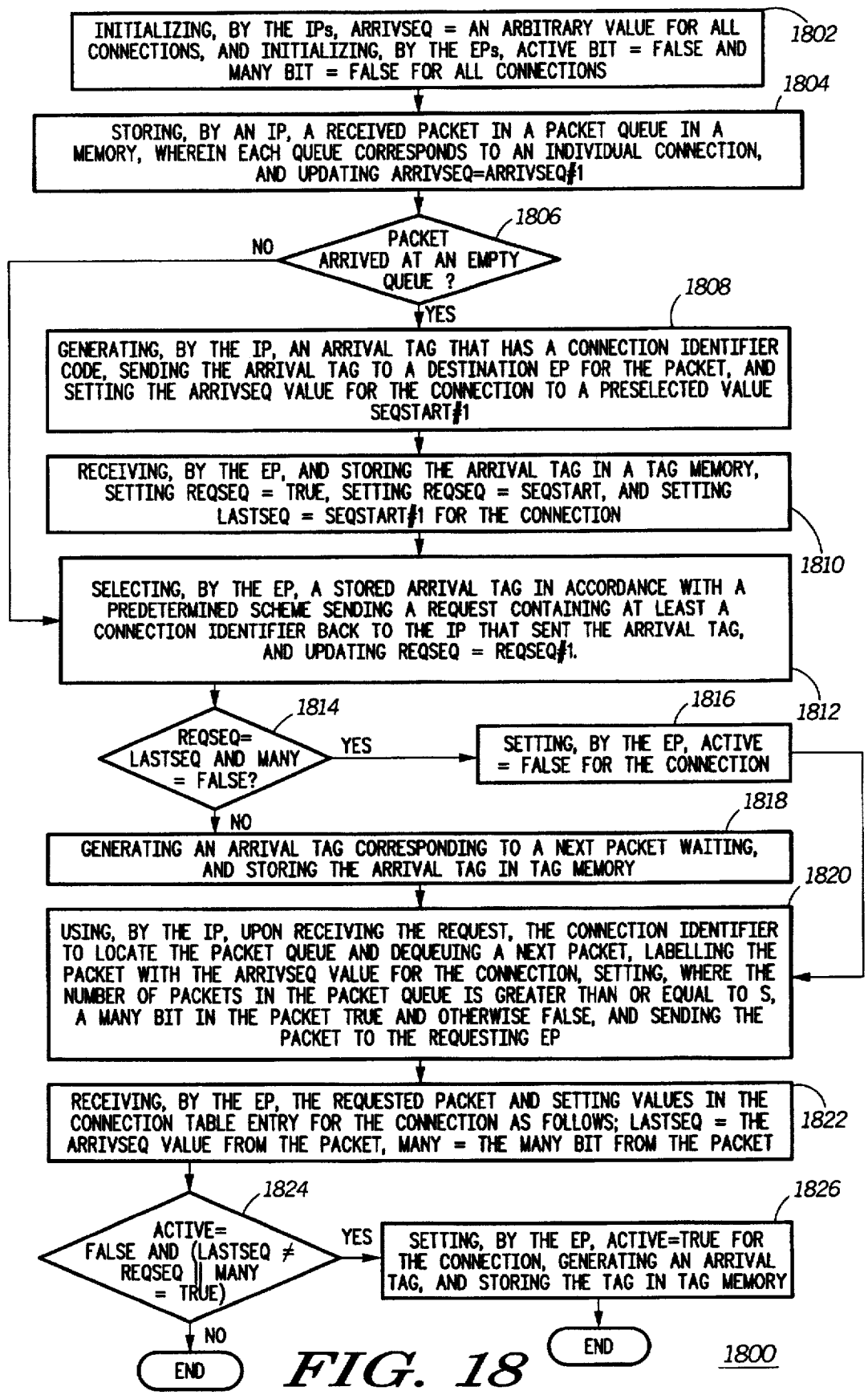
FIG. 18 is a flow chart of one embodiment of steps in accordance with the method of the present invention wherein a high-speed pipelined operation is implemented.

In a preferred embodiment, the above method may be modified for higher speed pipelined operation by giving the egress port information about the number of packets waiting that it can request. This implementation, shown in FIG. 18, numeral 1800, may be implemented as follows. For each connection through an IP, there is an associated modulo sequence count value ARRIVSEQ, typically 1 to 4 bits long, where the modulo of ARRIVSEQ is S, and "#" denotes addition modulo S. Initially the ARRIVSEQ value for each connection is set to an arbitrary value (1802). Also, coupled to the EP there is a connection table with an entry for each connection through the EP, containing at least an ACTIVE bit, a MANY bit, a REQSEQ value, and a LASTSEQ value, wherein REQSEQ and LASTSEQ values have the same number of bits as ARRIVSEQ. The ACTIVE bit and the MANY bit for each connection are initially set to False. Packets are switched from ingress ports to egress ports by means of the following steps:

A) First, a received packet that arrives at an IP via an ingress port is stored (1804) in a queue in a memory, wherein each queue corresponds to an individual connection, and the IP updates the ARRIVSEQ value associated with the connection to ARRIVSEQ#1.

B) For each packet that arrives at the IP, the IP determines (1806) whether the packet has arrived at an empty queue, and where the packet has arrived at an empty queue, proceeds to step C (1808), and otherwise, to step E (1812).

C) The IP generates (1808) an arrival tag that has a connection identifier code, and where selected, includes scheduling information, and sends the arrival tag to a destination EP for the packet. The IP sets the ARRIVSEQ value for the connection to a preselected value SEQSTART#1.

D) The EP receives and stores (1810) the arrival tag, sets the ACTIVE bit True, sets REQSEQ to SEQSTART, and sets LASTSEQ to SEQSTART#1 in the connection table entry for the connection;

E) The EP uses (1812) a predetermined scheme to select a stored arrival tag. For the selected connection, the EP sends a request containing at least a connection identifier back to the IP that sent the arrival tag. The EP also updates the REQSEQ value for the selected connection to REQSEQ#1, and compares the new value of REQSEQ to the value of LASTSEQ for the selected connection. Where REQSEQ≠LASTSEQ or the MANY bit for the connection is True (1814), the EP generates (1818) an arrival tag corresponding to a next packet waiting, and stores the arrival tag with other arrival tags. Otherwise, the EP sets (1816) the ACTIVE bit for the connection to False.

F) Upon receiving the request, the IP uses the connection identifier to locate (1820) the packet queue and dequeues a next packet. The IP labels the packet with the ARRIVSEQ value for the connection, and where the number of packets in the packet queue is greater than or equal to S, sets a MANY bit in the packet True and otherwise False. The IP then sends the packet to the requesting EP.

G) The EP receives (1822) the requested packet, copies the ARRIVSEQ label in the packet to the LASTSEQ value for the connection in the connection table, and copies the MANY bit in the packet to the MANY bit for the connection in the connection table. Where ACTIVE is False and (LASTSEQ≠REQSEQ || MANY=True) (1824), proceed to step H (1826) and otherwise end.

H) The EP generates (1826) an arrival tag corresponding to a next packet waiting, stores the arrival tag with other arrival tags, and sets the ACTIVE bit for the connection True.

Figure 19:
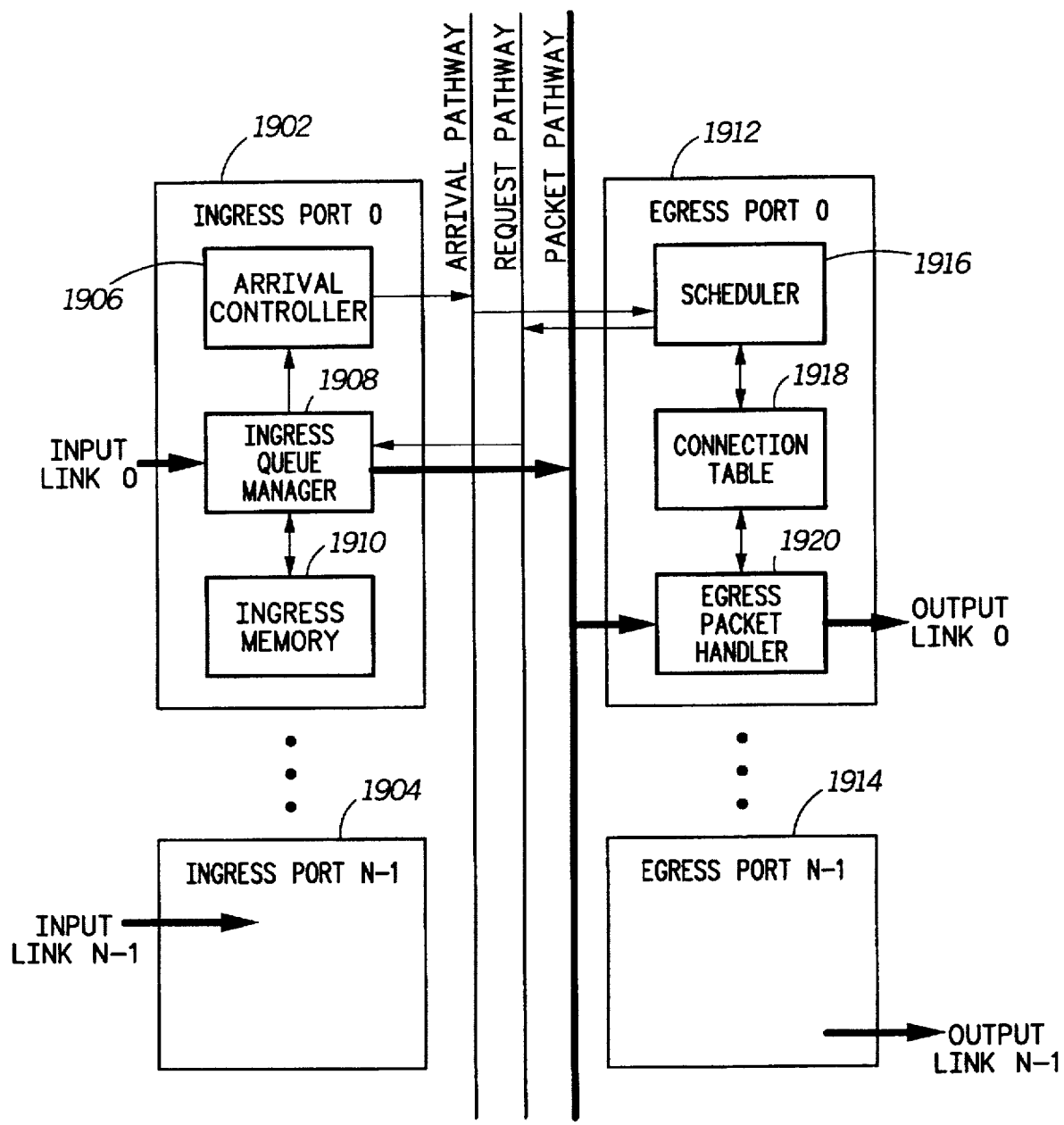
FIG. 19 is a block diagram of one embodiment of a switching device in accordance with the present invention.

FIG. 19, numeral 1900, is a block diagram of one embodiment of a device in accordance with the present invention. The device provides efficient switching of a plurality of packets from a plurality of ingress ports to a plurality of egress ports in a connection-oriented network. The device includes: a plurality of ingress ports (1902, . . . , 1904), each including an ingress memory (1910, . . . ), an ingress queue manager (1908), . . . , an arrival controller (1906, . . . ), and a plurality of egress ports (1912, . . . , 1914), each egress port including a connection table (1918, . . . ), a scheduler (1916, . . . ), and an egress packet handler (1920, . . . ). The ingress memory (1910, . . . ) is used for storing a queue of packets for each connection of a plurality of connections. The ingress queue manager (1908, . . . ) is coupled to the ingress port memory (1910, . . . ) and is utilized for receiving packets from an input link, storing the packets in ingress memory, and for updating queue status information associated with the connection. The IP has queue status information for each connection that goes through the IP and, upon receiving a connection identifier from a scheduler (1916, . . . ) of an egress port, retrieving a packet from the corresponding queue in ingress memory, updating the queue status information for the connection, and sending to the destination egress ports the packet together with queue status information for determining, by the EP, whether packets remain in the packet queue that are unrequested by the EP. The arrival controller (1906, . . . ) is coupled to the ingress queue manager (1906, . . . ), and is used for, where the queue for a connection is empty when the packet arrives, sending an arrival tag containing at least a connection identifier to a destination egress port for the packet. The egress ports (1912, . . . 1914) are coupled to the ingress ports (1902, . . . , 1904). The connection table (1918, . . . ) is used for storing, for each connection, at least an ACTIVE indicator, request status information, and queue status information. The scheduler (1916, . . . ) is coupled to the connection table (1918, . . . ), and is used for receiving arrival tags sent by ingress ports and setting the corresponding ACTIVE indicators True in the connection table (1918); and for selecting connections that have the ACTIVE indicator set in accordance with a predetermined scheme, and for each selected connection, requesting the packet from the ingress port that sent the corresponding arrival tag, updating the request status information, determining, using at least one of: queue status information and the request status information, whether packets remain in the packet queue that are unrequested by the EP, and where the packet queue is empty, setting, by the EP, the ACTIVE indicator False in the connection table. The egress packet handler (1920, . . . ) is coupled to the connection table (1918, . . . ) and is utilized for receiving the packet requested by the associated scheduler (1916, . . . ), storing the queue status information that accompanies the packet, and dispatching the packet on an output link, and where the ACTIVE indicator for the selected connection is False, determining, using at least one of: the queue status information and the request status information, whether packets remain in the packet queue that are unrequested by the EP, and where packets remain in the packet queue that are unrequested by the EP, setting the ACTIVE indicator True in the connection table (1918, . . . ).

Figure 20:
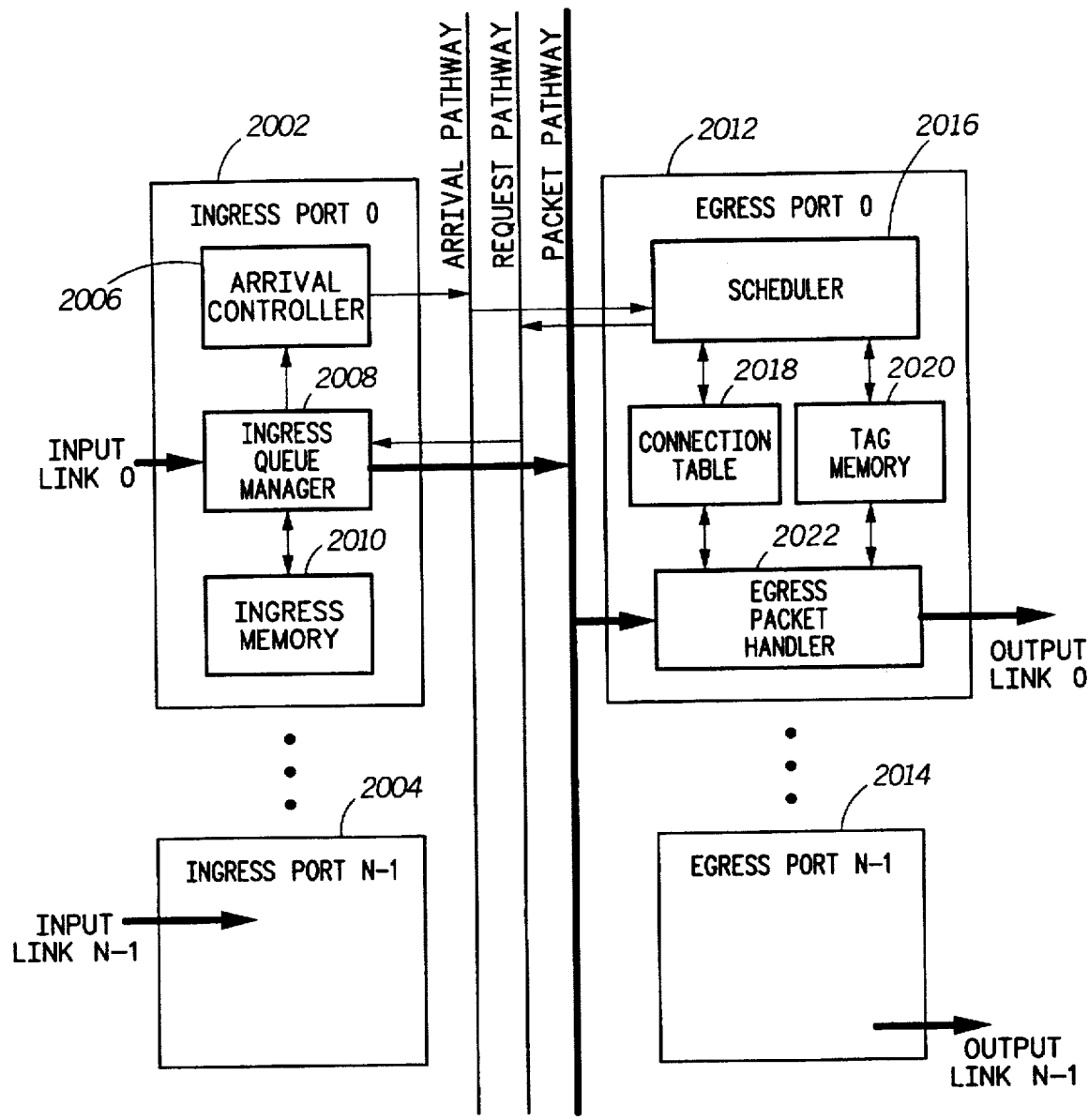
FIG. 20 is a block diagram of one embodiment of a device for efficient switching of a plurality of received packets from a plurality of ingress ports to a plurality of egress ports in accordance with the present invention.

Alternatively, as shown in FIG. 20, numeral 2000, the device for efficient switching of a plurality of received packets from a plurality of ingress ports to a plurality of egress ports, may be described as a plurality of ingress ports (2002, 2004, . . . ), each including an ingress memory (2010, . . . ), an ingress queue manager (2008, . . . ), and an arrival controller (2006, . . . ) and a plurality of egress ports (2012, 2014, . . . ) each including a connection table (2018, . . . ), a tag memory (2020, . . . ), a scheduler (2016, . . . ), and an egress packet handler (2022, . . . ). The ingress memory (2010, . . . ) is used for storing a queue of packets for each connection of a plurality of connections. The ingress queue manager (2008, . . . ) is coupled to the ingress memory (2010) and is used for receiving packets from an input link, storing the packets in ingress memory (2010, . . . ), and for updating queue status information associated with the connection, where the IP has queue status information for each connection that goes through the IP and, upon receiving a connection identifier from a scheduler (2012, . . . ) of an egress port, retrieving a packet from the corresponding queue in ingress memory (2010, . . . ), updating the queue status information for the connection, and sending to the destination egress ports (2012, 2014, . . . ) the packet together with queue status information for determining, by the EP, whether packets remain in the packet queue that are unrequested by the EP. The arrival controller (2006, . . . ) is coupled to the ingress queue manager (2008, . . . ) and is utilized for, where the queue for a connection is empty when the packet arrives, sending an arrival tag containing at least a connection identifier to a destination egress port for the packet. Again, the egress ports (2012, 2014, . . . ) are coupled to the ingress ports (2002, 2004, . . . ). The connection table (2018, . . . ) is used for storing, for each connection, at least an ACTIVE indicator, request status information, and queue status information. The tag memory (2020, . . . ) is used for storing at most one tag per connection. The scheduler (2016, . . . ) is coupled to the connection table (2018, . . . ) and tag memory (2020, . . . ), for receiving arrival tags sent by ingress ports, storing the arrival tags in tag memory (2020, . . . ), and setting the corresponding ACTIVE indicators True in the connection table (2018, . . . ); and for selecting a stored arrival tag in accordance with a predetermined scheme, and for each selected arrival tag, requesting the packet from the ingress port that sent the arrival tag, updating the request status information, determining, using at least one of: queue status information and the request status information, whether packets remain in the packet queue that are unrequested by the EP, and where the packet queue is empty, setting, by the EP, the ACTIVE indicator False in the connection table (2018, . . . ). The egress packet handler (2022, . . . ) is coupled to the connection table (2018, . . . ) and tag memory (2020, . . . ) and is utilized for receiving the packet requested by the associated scheduler, storing the queue status information that accompanies the packet, and dispatching the packet on an output link, and where the ACTIVE indicator for the selected connection is False, determining, using at least one of: the queue status information and the request status information, whether packets remain in the packet queue that are unrequested by the EP, and where packets remain in the packet queue that are unrequested by the EP, generating an arrival tag corresponding to a next packet waiting, storing the arrival tag in tag memory (2020, . . . ), and setting the ACTIVE indicator True in the connection table (2018, . . . ).

Figure 21:
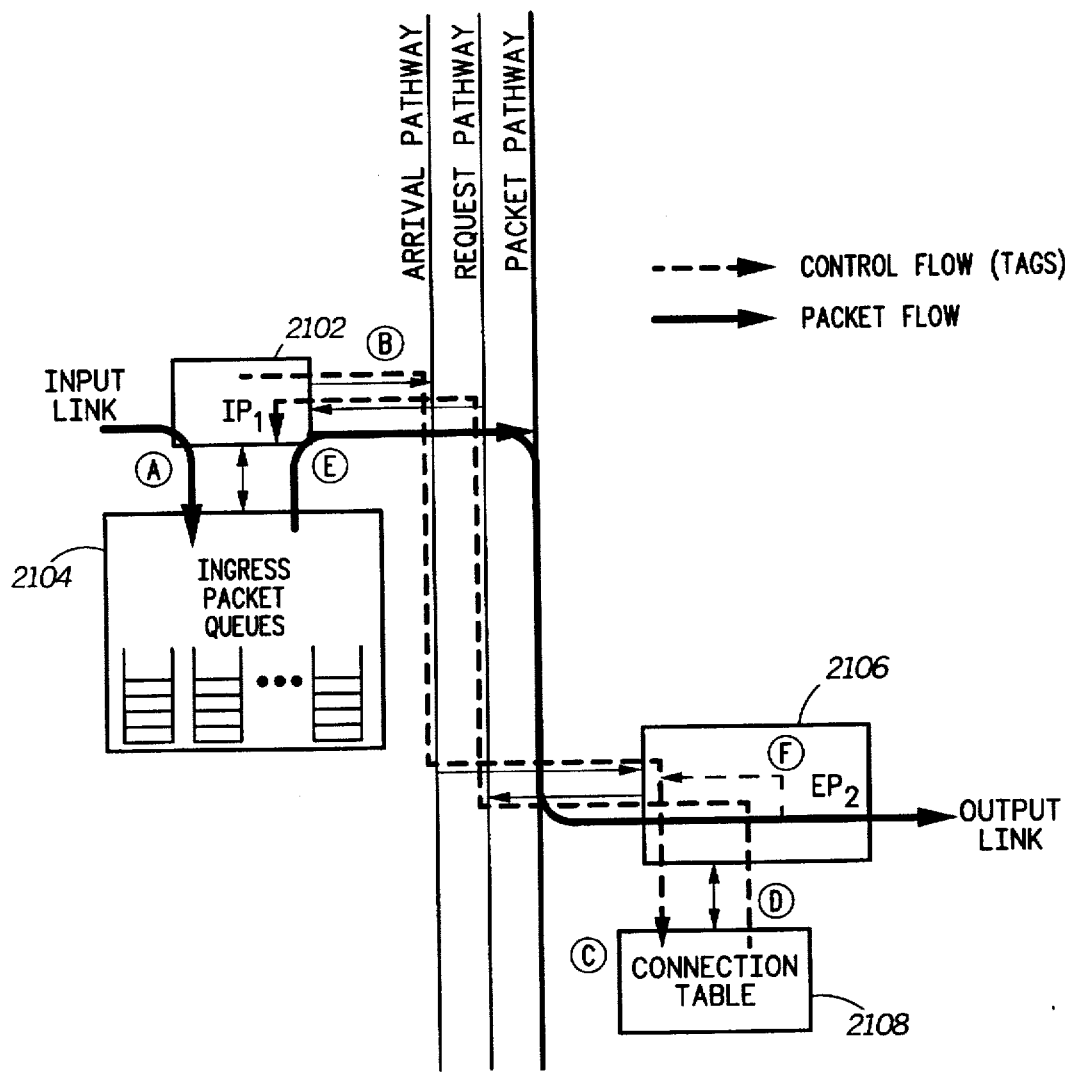
FIG. 21 is a block diagram showing the control flow and packet flow along an arrival pathway, a request pathway and a packet pathway in accordance with one embodiment of the present invention in which packets travel along prearranged routes.

FIG. 21, numeral 2100, is a block diagram showing the control flow and packet flow along an arrival pathway, a request pathway and a packet pathway in accordance with one embodiment of the present invention for connection-oriented networks. Packets arrive at an IP (2102) and are stored (a) in queues (2104) corresponding to individual connections. The IP sends an arrival tag (b) only if a packet arrives at an empty queue. Typically, the arrival tag contains a connection identifier code rather than the memory location of the stored packet. EPs (2106, . . . ) store tags in a connection table (2108). Each EP selects tag and sends it to an IP over the Request Pathway (d). When an IP receives a tag over the Request Pathway, the IP uses the connection identifier code in the tag to locate the packet queue in which the packet is stored and dequeues the next packet. The IP labels the packet with the number of other packets waiting in the queue, then sends the packet on the Packet Pathway (e) to an output link via the EP.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for switching of a plurality of received packets from a plurality of ingress ports to a plurality of egress ports, wherein the packets arriving at the ingress ports are stored and wherein switching of the packets to a destination egress port comprises the steps of:

storing, as each packet arrives, the packet in a packet memory associated with the ingress port at which the packet arrived;

sending arrival information to the destination egress port indicating that at least one packet has arrived;

requesting, by each destination egress port, the packet/packets that are stored; and sending, by each ingress port, packets requested at a rate up to a predetermined transfer rate of the ingress port and failing to send packets requested that require a transfer rate greater than the predetermined transfer rate, and where the packets fail to be sent, re-requesting, by the destination egress ports, the packets that failed to be sent.

2. The method of claim 1 wherein the arrival information includes an ingress port identifier, and wherein the step of requesting by the destination egress port includes sending a request signal to the ingress port according to the ingress port identifier.

3. The method of claim 1 wherein the arrival information includes an ingress port identifier and a memory location indicator, and wherein the step of requesting by the destination egress port includes sending a request signal to the ingress port according to the ingress port identifier and including the memory location indicator.

4. The method of claim 1 wherein the step of sending arrival information to the destination egress port comprises:

sending an arrival tag including the arrival information.

5. The method of claim 4 further comprising the step of:

storing, by the destination egress port, the arrival tag in a tag memory associated with the destination egress port.

6. The method of claim 5 wherein the step of requesting the packet/packets that are stored comprises the steps of:

selecting an arrival tag from the tag memory according to a predetermined scheme; and sending the arrival tag to the ingress port.

7. The method of claim 6 wherein the predetermined scheme includes:

a first-in-first-out scheme; and a scheme based on predetermined scheduling characteristics.

8. A method for switching of a plurality of received packets from a plurality of ingress ports to a plurality of egress ports, wherein the packets arriving at the ingress ports are stored and wherein switching of the packets to a destination egress port comprises the steps of:

storing, as each packet arrives, the packet in a packet memory associated with the ingress port at which the packet arrived;

sending arrival information to the destination egress port indicating that at least one packet has arrived;

requesting, by each destination egress port, in accordance with a predetermined scheme, the packet/packets that are stored; and sending the requested packets to the destination egress ports; wherein the plurality of ingress ports are connected to the plurality of egress ports through a rate-limited switch fabric having a rate less than the sum of the maximum rates of all of the egress ports, but greater than the sum of the average rates of all of the egress ports.

9. The method of claim 8 wherein the predetermined scheme includes storing the arrival information at each destination egress port and requesting the packet/packets in accordance with one of:

a first-in-first-out scheme; and a scheme based on predetermined scheduling characteristics.

10. A method for switching of a plurality of received packets from a plurality of ingress ports to a plurality of egress ports, wherein the packets arriving at the ingress ports are stored and wherein switching of the packets to a destination egress port comprises the steps of:

storing, as each packet arrives, the packet in a central packet memory;

sending arrival information to the destination egress port indicating that at least one packet has arrived;

requesting, by each destination egress port, in accordance with a predetermined scheme, the packet/packets that are stored; and sending the requested packets to the destination egress ports; wherein the central packet memory is connected to the plurality of egress ports through a rate-limited pathway having a rate less than the sum of the maximum rates of all of the egress ports, but greater than the sum of the average rates of all of the egress ports.

11. The method of claim 10 wherein the predetermined scheme includes storing the arrival information at each destination egress port and requesting the packet/packets in accordance with one of:

a first-in-first-out scheme; and a scheme based on predetermined scheduling characteristics.

12. An efficient packet switch for switching of a plurality of received packets from a plurality of ingress ports to a plurality of egress ports, wherein the packets arriving at the ingress ports are stored and wherein the switch comprises:

A) a plurality of arrival controllers, wherein each ingress port has an arrival controller, for sending arrival information to the destination egress port indicating that at least one packet has arrived; and B) a plurality of schedulers, wherein each egress port has a scheduler, coupled to the plurality of arrival controllers, for requesting, by each destination egress port, in accordance with a predetermined scheme, the packet/packets that are stored.

13. The method of claim 12 wherein the predetermined scheme includes storing the arrival information at each destination egress port and requesting the packet/packets in accordance with one of:

A) a first-in-first-out scheme; and

B) a scheme based on predetermined scheduling characteristics.

14. A packet switch for switching a received packet from one of a plurality of ingress ports to one of a plurality of egress ports, comprising:

A) a plurality of ingress ports connected to corresponding packet memories for determining a destination egress port for a received packet and storing the received packet;

B) a plurality of egress ports connected to corresponding tag memories, wherein the ingress ports and egress ports are interconnected and wherein the efficient packet switch operates by:

B1) determining a destination egress port for a received packet and storing the received packet in a packet memory connected to the receiving ingress port;

B2) sending, by the receiving ingress port, to the destination egress port, an arrival tag having at least a memory location and IP number indicating where the packet is stored;

B3) receiving, by the destination egress port, the arrival tags and storing the arrival tags in a tag memory connected to the destination egress port;

B4) selecting, by the destination egress port, a stored arrival tag in accordance with a predetermined scheme, and sending the selected stored arrival tag back to the ingress port that sent the arrival tag to request transmission of the received packet associated with the arrival tag;

5) receiving, by the ingress port, the selected stored arrival tag, retrieving the received packet associated with the arrival tag, and sending the received packet associated with the arrival tag to the destination egress port; and 6) receiving, by the destination egress port, the received packet associated with the arrival tag and dispatching the received packet from the destination egress port; wherein, where an ingress port receives a plurality of arrival tags representing requests for packets from a plurality of egress ports, the ingress port sends packets requested in accordance with a predetermined request rate and refuses requests exceeding the predetermined request rate and wherein, where an egress port's request is refused, the egress port repeats the request.

15. The packet switch of claim 14, in the operation of said switch in B, further including in B2) sending the arrival tag on an arrival pathway and in B4) sending the selected arrival tag on a request pathway and in B5) sending the packet on a packet pathway.

16. The packet switch of claim 14 wherein the arrival tag includes information for organizing tags that represent waiting packets into multiple queues representing at least one of:

A) different connections;

B) priorities; and

C) qualities of service;

for scheduling the packet in the destination egress port.

17. The packet switch of claim 14 wherein, where average total switch traffic rates are less than the sum of the maximum rate R on all N egress ports, that is, less than N*R, the packet pathway has an information rate c*N*R, c being a predetermined value less than one.

18. The packet switch of claim 14 wherein the egress ports organize tags that represent waiting packets into multiple queues representing different connections, priorities, or qualities of service.

19. A packet switch for switching a received packet from one of a plurality of ingress ports to one of a plurality of egress ports, comprising:

A) a plurality of ingress ports connected to corresponding packet memories for determining a destination egress port for a received packet and storing the received packet;

B) a plurality of egress ports connected to corresponding tag memories, wherein the ingress ports and egress ports are interconnected and wherein the efficient packet switch operates by;

B1) determining a destination egress port for a received packet and storing the received packet in a packet memory connected to the receiving ingress B2) sending, by the receiving ingress port, to the destination egress port, an arrival tag having at least a memory location and IP number indicating where the packet is stored;

B3) receiving, by the destination egress port, the arrival tags and storing the arrival tags in a tag memory connected to the destination egress port;

B4) selecting by the destination egress port, a stored arrival tag in accordance with a predetermined scheme, and sending the selected stored arrival tag back to the ingress port that sent the arrival tag to request transmission of the received packet associated with the arrival tag;

5) receiving, by the ingress port, the selected stored arrival tag, retrieving the received packet associated with the arrival tag, and sending the received packet associated with the arrival tag to the destination egress port; and 6) receiving, by the destination egress port, the received packet associated with the arrival tag and dispatching the received packet from the destination egress port wherein the packet switch is synchronized into cell cycles by means of a centrally generated CELLCLK signal provided by a cell clock line that is connected to all ingress and egress ports, where a cell cycle is a period of time during which only one packet arrives at each ingress port, each ingress port generates only one arrival tag per cell cycle, each egress port generates only one request per cell cycle, and each egress port sends a maximum of one packet per cell cycle on an egress link.

20. The packet switch of claim 19 wherein the efficient packet switch utilizes a predetermined arbitration scheme that limits in each cell cycle a number of requests accepted by ingress port i to a preselected integer $k_i$ and limits a total number of requests accepted by all ingress ports to a predetermined integer M.

21. The packet switch of claim 20 wherein said switch includes N ingress ports and N egress ports with unique identification numbers, IDs, and having a request pathway from egress ports to ingress ports, and having an acknowledge line from ingress ports to egress ports, and wherein the steps of the predetermined arbitration scheme include:

23A) issuing, by each of a plurality of egress ports that have a current REQUEST signal, a REQUEST on the REQUEST pathway, wherein the REQUEST signal includes a VALID bit having values True and False, and a QPORT number specifying an ingress port ID, and wherein the REQUESTs of the plurality of egress ports are issued one at a time in a predetermined sequence; and 23B) responding, subsequent to each REQUEST in which the VALID bit is True, by an ingress port with an ID matching the QPORT in the REQUEST signal, with an ACKNOWLEDGE bit of Accept or Reject based at least on whether the ingress port has already accepted k REQUESTs, k a predetermined integer.

22. The packet switch of claim 21 wherein, in step 23B of the arbitration scheme, the ACKNOWLEDGE bit of Accept/Reject is also based at least on at least whether M REQUESTs have already been accepted in the current cell cycle, M a predetermined integer.

23. The packet switch of claim 21 where the N egress ports have unique arbitration sequence numbers from 0 to N-1, and in step A, issuing REQUEST signals in round-robin order of the arbitration sequence numbers and upon a REQUEST from an egress port being rejected, using the first egress port that issued a rejected REQUEST in the current cell cycle as a new starting point for subsequent cell cycles.

24. The packet switch of claim 23 wherein a SYNC line connects all egress ports and wherein all egress ports contain a START register and a SOURCE counter, and wherein the steps of the predetermined arbitration scheme include:

A) maintaining a SOURCE counter by each egress port indicating the arbitration sequence number of the egress port currently making a REQUEST, and asserting a SYNC signal every time the egress port's SOURCE counter equals a predetermined value, B) monitoring the SYNC signal by each egress port, and where the SYNC signal is asserted for more than one clock cycle in a cell cycle, resetting, by the egress port a START value to a preselected value, where the preselected value is the same for all egress ports.

25. The packet switch of claim 20 wherein the switch has N ingress ports IPs and N egress ports EPs numbered from 0 to N-1, and has a cell cycle timing signal CELLCLK, and a timing signal CLK, where there are at least N+1 cycles per cycle of CELLCLK and wherein CELLCLK signals and CLK signals are provided to all ingress ports and all egress ports of said switch, wherein the predetermined arbitration scheme includes the steps of:

A) initializing all egress port START values to zero and proceeding to step B at a beginning of a next CELLCLK cycle;

B) initializing, in each egress port, EP, a CLOCK counter to 0 and copying, in each EP, the EP START value into a SOURCE counter, and proceeding to step H;

C) proceeding, upon the VALID bit in a last REQUEST being True, to step D, and otherwise to step F;

D) responding, by an ingress port, on the acknowledge pathway, upon the ingress port's number matching the QPORT number in the last REQUEST, with an ACKNOWLEDGE bit of one of: Accept and Reject where the ACKNOWLEDGE bit is Reject if the IP already has accepted, on the acknowledge pathway, k REQUESTs or if M REQUESTs have already been accepted by any ingress port since a beginning of a current cell cycle, where a number of REQUESTs accepted per IP is limited to a predetermined integer k associated with the IP, and a total number of REQUESTs accepted by the plurality of IPs is limited to a predetermined integer M and is Accept otherwise;

E) capturing, by the EP that made the last REQUEST, the ACKNOWLEDGE bit as a final result of arbitration;

F) synchronizing START values by capturing, by all EPs, the ACKNOWLEDGE bit, and where the ACKNOWLEDGE bit is a first Reject in a current cell cycle, setting the START value to a current SOURCE counter value;

G) proceeding, where the CLOCK counter value is less than N, to step H, and otherwise to step J;

H) sending, by the IP, where the IP's number matches the current SOURCE counter value, a REQUEST signal that includes a VALID bit, which is true where an EP is requesting a packet and a QPORT number which specifies an IP from which the packet is being requested;

I) incrementing, by the EPs, the CLOCK counter value and the SOURCE counter value, and where the new SOURCE counter value is equal to N, resetting it to 0 to provide a modulo N counter, and returning to step C at the beginning of the next cycle of CLK; and J) returning, by the EPs, at the beginning of the next CELLCLK cycle, to step B.

26. The packet switch of claim 25, wherein the arbitration scheme includes a recovery mechanism in case of error wherein the following step is added in step I prior to returning to step C at the beginning of the next cycle of CLK: asserting, by the EPs, a wired-OR synchronization signal, SYNC, when the EP's SOURCE counter value is equal to zero, and monitoring, by the EPs, the SYNC signal in each clock cycle, and where SYNC is True for more than one clock cycle in a current cell cycle, setting the START value to zero.

27. A method for switching of a plurality of received packets from a plurality of ingress ports, IPs, to a plurality of egress ports, EPs, wherein for each connection through an EP, a corresponding ACTIVE indicator is initialized to False, and wherein the packets arriving at the IPs are stored in packet queues, wherein each queue corresponds to an individual connection, comprising the steps of:

A) determining, by the IP, for each packet that arrives at the IP, whether the packet has arrived at an empty queue, and where the packet has arrived at an empty queue, generating, by the IP, an arrival tag that has a connection identifier code, sending, by the IP, the arrival tag to a destination egress port EP for the packet, and proceeding to step B, and otherwise to step C;

B) receiving, by the EP, the arrival tag and recording an arrival of the arrival tag by setting an ACTIVE indicator True in a connection table coupled to the EP, where the connection table has an ACTIVE indicator for each connection that goes through the EP;

C) selecting, by the EP, from among the connections that have the ACTIVE indicator True in the connection table, a connection in accordance with a predetermined scheme, setting the ACTIVE indicator False for the selected connection, and sending a request containing at least a connection identifier back to the IP that sent the arrival tag;

D) using, by the IP, upon receiving the request, the connection identifier to locate the packet queue and dequeuing a next packet, labeling the packet with a MORE indicator which is True if there are more packets remaining in the queue and False otherwise, and sending the packet to the requesting EP; and E) receiving, by the EP, the requested packet, and where the MORE indicator in the packet is True, setting, by the EP, the ACTIVE indicator True in the connection table.

28. A method for switching of a plurality of received packets from a plurality of ingress ports to a plurality of egress ports, wherein for each connection through an IP there is associated queue status information which is initialized to a first predetermined starting value, and coupled to the EP there is a connection table with an entry for each connection through the EP, containing at least an ACTIVE indicator initialized to False, request status information initialized to a second predetermined starting value, and queue status information which is initialized to a first predetermined starting value, and wherein the packets arriving at the ingress ports are stored in packet queues, wherein each queue corresponds to an individual connection, comprising the steps of:

A) updating, by the IP, for each packet that arrives at the IP, the queue status information for the associated connection, determining, by the IP, whether the packet has arrived at an empty queue, and where the packet has arrived at an empty queue, generating, by the IP, an arrival tag that has a connection identifier code, sending, by the IP, the arrival tag to a destination egress port EP for the packet, and proceeding to step B, and otherwise to step C;

B) receiving, by the EP, the arrival tag and recording an arrival of the arrival tag by setting the ACTIVE indicator True for the connection;

C) selecting, by the EP, from among the connections that have the ACTIVE indicator True in the connection table, a connection in accordance with a predetermined scheme, sending a request containing at least a connection identifier back to the IP that sent the arrival tag, updating the request status information for the connection, determining, using at least one of: the queue status information and the request status information, whether packets remain in the packet queue that are unrequested by the EP, and where the packet queue is empty, setting, by the EP, the ACTIVE indicator False in the connection table;

D) using, by the IP, upon receiving the request, the connection identifier to locate the packet queue and dequeuing a next packet, updating the queue status information for the connection, labeling the packet with queue status information for determining, by the EP, whether packets remain in the packet queue that are unrequested by the EP, and sending the packet to the requesting EP; and E) receiving, by the EP, the requested packet, storing the queue status information that accompanies the packet in the connection table, and where the ACTIVE indicator for the selected connection is False, determining, using at least one of: the queue status information and the request status information, whether packets remain in the packet queue that are unrequested by the EP, and where packets remain in the packet queue that are unrequested by the EP, setting, by the EP, the ACTIVE indicator True in the connection table.

29. A method for switching of a plurality of received packets from a plurality of ingress ports to a plurality of egress ports, wherein for each connection through an IP there is an associated modulo sequence count value ARRIVSEQ, where the modulo of ARRIVSEQ is S, "#" denotes addition modulo S, and "||" denotes a Boolean OR operator; and wherein for each connection through an EP, there is an entry in a connection table coupled to the EP containing at least an ACTIVE bit, a MANY bit, a REQSEQ value, and a LASTSEQ value, and the ACTIVE bit for each connection is initially set to False; comprising the steps of:

A) storing, by an IP, a received packet in a packet queue in a memory, wherein each queue corresponds to an individual connection, and updating the ARRIVSEQ value associated with the connection to ARRIVSEQ#1;

B) determining, by the IP, for each packet that arrives at the IP, whether the packet has arrived at an empty queue, and where the packet has arrived at an empty queue, proceeding to step C, and otherwise, to step E;

C) generating, by the IP, an arrival tag that has a connection identifier code, and where selected, includes scheduling information, and sending, by the IP, the arrival tag to a destination EP for the packet, and setting the ARRIVSEQ value associated with the connection to a preselected value SEQSTART#1;

D) receiving, by the EP, the arrival tag and recording an arrival of the arrival tag by setting the ACTIVE bit, setting REQSEQ to SEQSTART, and setting LASTSEQ to SEQSTART#1 in the connection table entry for the connection;

E) selecting, by the EP, from among the connections that have ACTIVE bit set in the connection table, a connection in accordance with a predetermined scheme, sending a request containing at least a connection identifier back to the IP that sent the arrival tag, updating the REQSEQ value for the selected connection to REQSEQ#1, and comparing the new value of REQSEQ to the value of LASTSEQ for the selected connection, and where they are equal and the MANY bit for the connection is False, setting the ACTIVE bit for the connection to False;

F) using, by the IP, upon receiving the request, the connection identifier to locate the packet queue and dequeuing a next packet, labeling the packet with the ARRIVSEQ value for the connection, and setting, where the number of packets in the packet queue is greater than or equal to S, a MANY bit in the packet True, and otherwise False; and G) receiving, by the EP, the requested packet, copying the ARRIVSEQ label in the packet to the LASTSEQ value for the connection in the connection table, copying the MANY bit in the packet to the MANY bit for the connection in the connection table, setting, where LASTSEQ≠REQSEQ || MANY=True for the connection, the ACTIVE bit for the connection True.

30. The method of claim 29, wherein, for maximum speed operation, modulo S is selected to be greater than a maximum number of packets that may be requested by an EP during a delay between request of a packet in step E and the packet being received in step G.

31. The method of claim 30 wherein, in the packet, MANY and ARRIVSEQ are encoded into a single set of bits ASEQ, such that a particular value of ASEQ is reserved to mean that MANY is True, and in the EP's connection table, MANY and LASTSEQ are encoded into a single set of bits LSEQ in the same manner.

32. A method for switching of a plurality of received packets from a plurality of ingress ports to a plurality of egress ports, comprising the steps of:

A) storing, by an IP, a received packet in a packet queue in a memory, wherein each queue corresponds to an individual connection;

B) determining, by the IP, for each packet that arrives at the IP, whether the packet has arrived at an empty queue, and where the packet has arrived at an empty queue, proceeding to step C, and otherwise, to step E;

C) generating, by the IP, an arrival tag that has a connection identifier code, and where selected, includes scheduling information and sending, by the IP, the arrival tag to a destination egress port EP for the packet;

D) receiving, by the EP, and storing the arrival tag;

E) selecting, by the EP, a stored arrival tag in accordance with a predetermined scheme, and sending the arrival tag back to the IP that sent the arrival tag;

F) using, by the IP, upon receiving the request, the connection identifier to locate the packet queue and dequeuing a next packet, labeling the packet with a MORE bit which is True if there are more packets remaining in the queue and False otherwise, and sending the packet to the requesting EP;

G) receiving, by the EP, the requested packet, and where the MORE bit in the packet is True, generating an arrival tag corresponding to a next packet waiting, storing the arrival tag with other arrival tags.

33. A method for switching of a plurality of received packets from a plurality of ingress ports to a plurality of egress ports, wherein for each connection through an IP there is an associated modulo sequence count value ARRIVSEQ, where the modulo of ARRIVSEQ is S, "#"

denotes addition modulo S, and "||" denotes a Boolean OR operator; and wherein for each connection through an EP, there is an entry in a connection table coupled to the EP containing at least an ACTIVE bit, a MANY bit, a REQSEQ value, and a LASTSEQ value, and the ACTIVE bit for each connection is set to False, comprising the steps of:

A) storing, by an IP, a received packet in a packet queue in a memory, wherein each queue corresponds to an individual connection, and updating the ARRIVSEQ value associated with the connection to ARRIVSEQ#1;

B) determining, by the IP, for each packet that arrives at the IP, whether the packet has arrived at an empty queue, and where the packet has arrived at an empty queue, proceeding to step C, and otherwise, to step E;

C) generating, by the IP, an arrival tag that has a connection identifier code, and where selected, includes scheduling information, and sending, by the IP, the arrival tag to a destination EP for the packet, and setting the ARRIVSEQ value associated with the connection to a preselected value SEQSTART#1;

D) receiving, by the EP, and storing the arrival tag, setting the ACTIVE bit, setting REQSEQ to SEQSTART, and setting LASTSEQ to SEQSTART#1 in the connection table entry for the connection;

E) selecting, by the EP, a stored arrival tag in accordance with a predetermined scheme, sending a request containing at least a connection identifier back to the IP that sent the arrival tag, setting the REQSEQ value for the selected connection to REQSEQ#1, comparing the new value of REQSEQ to the value of LASTSEQ for the selected connection, and generating, where REQSEQ # LASTSEQ or the MANY bit for the connection is True, an arrival tag corresponding to a next packet waiting, and storing the arrival tag with other arrival tags, and otherwise setting the ACTIVE bit for the connection to False;

F) using, by the IP, upon receiving the request, the connection identifier to locate the packet queue and dequeuing a next packet, labeling the packet with the ARRIVSEQ value for the connection, and setting, where the number of packets in the packet queue is greater than or equal to S, a MANY bit in the packet True, and otherwise False; and G) receiving, by the EP, the requested packet, copying the ARRIVSEQ label in the packet to the LASTSEQ value for the connection in the connection table, copying the MANY bit in the packet to the MANY bit for the connection in the connection table, and where the ACTIVE bit is False and (LASTSEQ # REQSEQ || MANY=True), proceeding to step H and otherwise end; and H) generating, by the EP, an arrival tag corresponding to a next packet waiting, storing the arrival tag with other arrival tags, and setting the ACTIVE bit for the connection.

34. A device for switching of a plurality of received packets from a plurality of ingress ports to a plurality of egress ports, comprising:

a plurality of ingress ports, each comprising:
A) an ingress memory for storing a queue of packets for each connection of a plurality of connections;
B) an ingress queue manager coupled to the ingress memory for receiving packets from an input link, storing the packets in ingress memory, and for updating queue status information associated with the connection, where the IP has queue status information for each connection that goes through the IP and, upon receiving a connection identifier from a scheduler of an egress port, retrieving a packet from the corresponding queue in ingress port memory, updating the queue status information for the connection, and sending to the destination egress ports the packet together with queue status information for determining, by the EP, whether packets remain in the packet queue that are unrequested by the EP;
C) an arrival controller, coupled to the ingress queue manager, for, where the queue for a connection is empty when the packet arrives, sending an arrival tag containing at least a connection identifier to a destination egress port for the packet;

and a plurality of egress ports, wherein the egress ports are coupled to the ingress ports, and each egress port comprises:
D) a connection table for storing, for each connection, at least an ACTIVE indicator, request status information, and queue status information;
E) a scheduler, coupled to the connection table, for receiving arrival tags sent by ingress ports and setting the corresponding ACTIVE indicators True in the connection table; and for selecting connections that have the ACTIVE indicator set in accordance with a predetermined scheme, and for each selected connection, requesting the packet from the ingress port that sent the corresponding arrival tag, updating the request status information, determining, using at least one of: queue status information and the request status information, whether packets remain in the packet queue that are unrequested by the EP, and where the packet queue is empty, setting, by the EP, the ACTIVE indicator False in the connection table;
F) an egress packet handler coupled to the connection table, for receiving the packet requested by the associated scheduler, storing the queue status information that accompanies the packet, and dispatching the packet on an output link, and where the ACTIVE indicator for the selected connection is False, determining, using at least one of: the queue status information and the request status information, whether packets remain in the packet queue that are unrequested by the EP, and where packets remain in the packet queue that are unrequested by the EP, setting the ACTIVE indicator True in the connection table.

35. A device for switching of a plurality of received packets from a plurality of ingress ports to a plurality of egress ports, comprising:

a plurality of ingress ports, each comprising:
A) an ingress memory for storing a queue of packets for each connection of a plurality of connections;
B) an ingress queue manager coupled to the ingress memory for receiving packets from an input link, storing the packets in ingress memory, and for updating queue status information associated with the connection, where the IP has queue status information for each connection that goes through the IP and, upon receiving a connection identifier from a scheduler of an egress port, retrieving a packet from the corresponding queue in ingress memory, updating the queue status information for the connection, and sending to the destination egress ports the packet together with queue status information for determining, by the EP, whether packets remain in the packet queue that are unrequested by the EP;

C) an arrival controller, coupled to the ingress queue manager, for, where the queue for a connection is empty when the packet arrives, sending an arrival tag containing at least a connection identifier to a destination egress port for the packet;

and a plurality of egress ports, wherein the egress ports are coupled to the ingress ports, and each egress port comprises:

D) a connection table for storing, for each connection, at least an ACTIVE indicator, request status information, and queue status information;

E) a tag memory for storing at most one tag per connection;

F) a scheduler, coupled to the connection table and tag memory, for receiving arrival tags sent by ingress ports, storing the arrival tags in tag memory, and setting the corresponding ACTIVE indicators True in the connection table; and for selecting a stored arrival tag in accordance with a predetermined scheme, and for each selected arrival tag, requesting the packet from the input port that sent the arrival tag, updating the request status information, determining, using at least one of: queue status information and the request status information, whether packets remain in the packet queue that are unrequested by the EP, and where the packet queue is empty, setting, by the EP, the ACTIVE indicator False in the connection table;

G) an egress packet handler coupled to the connection table and tag memory, for receiving the packet requested by the associated scheduler, storing the queue status information that accompanies the packet, and dispatching the packet on an output link, and where the ACTIVE indicator for the selected connection is False, determining, using at least one of: the queue status information and the request status information, whether packets remain in the packet queue that are unrequested by the EP, and where packets remain in the packet queue that are unrequested by the EP, generating an arrival tag corresponding to a next packet waiting, storing the arrival tag in tag memory, and setting the ACTIVE indicator True in the connection table.

36. A method for switching of a plurality of received packets from a plurality of ingress ports to a plurality of egress ports, wherein the packets arriving at the ingress ports are stored and wherein switching of the packets to a destination egress port comprises the steps of:

storing, as each packet arrives, the packet in a central shared memory having a shared memory controller;

sending arrival information to the destination egress port indicating that at least one packet has arrived;

requesting, by each destination egress port, the packet/packets that are stored; and sending, by the shared memory controller, packets requested at a rate up to a predetermined transfer rate and failing to send packets requested that require a transfer rate greater than the predetermined transfer rate, and where the packets fail to be sent, re-requesting, by the destination egress ports, the packets that failed to be sent.

37. The method of claim 36 wherein the arrival information includes a memory location indicator, and wherein the step of requesting by the destination egress port includes sending a request signal to the shared memory controller and including the memory location indicator.

38. The method of claim 36 wherein the step of sending arrival information to the destination egress port comprises:

sending an arrival tag including the arrival information.

39. The method of claim 38 further comprising the step of:

storing, by the destination egress port, the arrival tag in a tag memory associated with the destination egress port.

40. The method of claim 39 wherein the step of requesting the packet/packets that are stored comprises the steps of:

selecting an arrival tag from the tag memory according to a predetermined scheme; and sending the arrival tag to the shared memory controller.

41. The method of claim 40 wherein the predetermined scheme includes:

a first-in-first-out scheme; and a scheme based on predetermined scheduling characteristics.

* * * * *